United States Patent
Liu et al.

(10) Patent No.: US 11,245,563 B2
(45) Date of Patent: Feb. 8, 2022

(54) METHOD AND DEVICE FOR TRANSMITTING REFERENCE SIGNAL

(71) Applicant: HUAWEI TECHNOLOGIES CO., LTD., Guangdong (CN)

(72) Inventors: Fengwei Liu, Chengdu (CN); Lei Chen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 246 days.

(21) Appl. No.: 16/506,761

(22) Filed: Jul. 9, 2019

(65) Prior Publication Data

US 2019/0334751 A1 Oct. 31, 2019

Related U.S. Application Data

(63) Continuation of application No. PCT/CN2018/071925, filed on Jan. 9, 2018.

(30) Foreign Application Priority Data

Jan. 9, 2017 (CN) .......................... 201710014450.X

(51) Int. Cl.
*H04L 27/26* (2006.01)
*H04L 1/18* (2006.01)
*H04L 5/00* (2006.01)

(52) U.S. Cl.
CPC ........ *H04L 27/2636* (2013.01); *H04L 1/1861* (2013.01); *H04L 5/0007* (2013.01); *H04L 5/0051* (2013.01); *H04L 27/2613* (2013.01)

(58) Field of Classification Search
None
See application file for complete search history.

(56) References Cited

U.S. PATENT DOCUMENTS

2007/0183386 A1 8/2007 Muharemovic et al.
2012/0114021 A1* 5/2012 Chung ............... H04B 7/15557
375/211

(Continued)

FOREIGN PATENT DOCUMENTS

CN 1852274 A 10/2006
CN 101340228 A 1/2009

(Continued)

OTHER PUBLICATIONS

Extended European Search Report issued in European Application No. 18736362.7 dated Dec. 17, 2019, 8 pages.

(Continued)

*Primary Examiner* — Mariela Vidal Carpio
(74) *Attorney, Agent, or Firm* — Fish & Richardson P.C.

(57) ABSTRACT

Embodiments of this application provide a method for transmitting a reference signal, including: sending, by a network device to UE, information about a waveform, an antenna port, and a resource block, where the waveform includes an OFDM waveform or a DFT-s-OFDM waveform, the antenna port indicates a resource mapping pattern used by the UE to send or receive a reference signal, and in a symbol of the resource mapping pattern, a reference signal corresponding to the DFT-s-OFDM waveform is mapped in frequency domain in a comb-shaped manner, and a reference signal corresponding to the OFDM waveform is mapped to a frequency domain resource to which the DFT-s-OFDM waveform is not mapped; and sending, by the network device, the reference signal or receiving the reference signal on the resource block based on the information about the waveform, the information about the antenna port, and the information about the resource block.

9 Claims, 15 Drawing Sheets

(56) References Cited

U.S. PATENT DOCUMENTS

| | | | | |
|---|---|---|---|---|
| 2013/0265962 | A1* | 10/2013 | Ouchi | H04W 72/02 370/329 |
| 2014/0269249 | A1* | 9/2014 | Bai | H04L 5/0094 370/204 |
| 2014/0286304 | A1* | 9/2014 | Yoon | H04B 7/0626 370/330 |
| 2015/0319718 | A1* | 11/2015 | Yang | H04W 24/08 370/252 |
| 2016/0095105 | A1* | 3/2016 | Chen | H04L 1/1861 370/329 |
| 2017/0078006 | A1* | 3/2017 | Liu | H04L 27/2613 |
| 2018/0278395 | A1* | 9/2018 | Yoon | H04L 5/0007 |
| 2019/0181936 | A1* | 6/2019 | Park | H04B 7/0647 |
| 2019/0260454 | A1* | 8/2019 | Lindbom | H04L 25/0224 |
| 2019/0268089 | A1* | 8/2019 | Fu | H04L 5/0051 |
| 2019/0334751 | A1* | 10/2019 | Liu | H04L 1/1861 |
| 2020/0322199 | A1* | 10/2020 | Matsumura | H04L 5/0048 |
| 2020/0344020 | A1* | 10/2020 | Guo | H04L 5/0051 |

FOREIGN PATENT DOCUMENTS

| | | |
|---|---|---|
| CN | 101478338 A | 7/2009 |
| CN | 103139125 A | 6/2013 |
| JP | 2015513863 A | 5/2015 |
| JP | 2016517653 A | 6/2016 |
| JP | 2016518758 A | 6/2016 |
| WO | 2010146985 A1 | 12/2010 |

OTHER PUBLICATIONS

R1-1611812—LG Electronics, "DMRS Design Principle," 3GPP Draft; 3GPP TSG RAN WG1 Meeting #87, Reno, USA, Nov. 14-18, 2016, XP051175781, 6 pages.

Office Action issued in Chinese Application No. 201910604157.8 dated Sep. 4, 2020, 6 pages (with English translation).

Office Action issued in Japanese Application No. 2019-537255 dated Feb. 1, 2021, 15 pages (with English translation).

PCT International Search Report and Written Opinion issued in International Application No. PCT/CN2018/071,925, dated Mar. 27, 2018, 11 pages (With Partial English Translation).

Nokia, Alcatel-Lucent Shanghai Bell, "UL SRS design considerations in NR[online]," 3GPP TSG RAN WG1 NR Ad-Hoc Meeting, R1-1701106, Spokane, UA, Jan. 16-20, 2017, 5 pages.

Office Action issued in Japanese Application No. 2019-537255 dated Jun. 14, 2021, 16 pages (with English translation).

* cited by examiner

METHOD AND DEVICE FOR TRANSMITTING REFERENCE SIGNAL

CROSS-REFERENCE TO RELATED APPLICATIONS

This application is a continuation of International Application No. PCT/CN2018/071925, filed on Jan. 9, 2018, which claims priority to Chinese Patent Application No. 201710014450.X, filed on Jan. 9, 2017. The disclosures of the aforementioned applications are hereby incorporated by reference in their entireties.

TECHNICAL FIELD

Embodiments of this application relate to the communications field, and more specifically, to a method and device for transmitting a reference signal.

BACKGROUND

Orthogonal frequency division multiplexing (OFDM) and discrete Fourier transform-spread-orthogonal frequency division multiplexing (DFT-s-OFDM) are two typical waveforms in wireless communication. The OFDM is a multi-carrier waveform, and has advantages such as a strong anti-multipath capability and a flexible frequency division multiplexing manner, but also has a disadvantage of an excessively high peak-to-average power ratio (PAPR). In the DFT-s-OFDM, discrete Fourier transform (DFT) spread is introduced before inverse fast Fourier transform (IFFT) of the OFDM, thereby providing a PAPR that is far lower than that of the OFDM while achieving a plurality of advantages of the OFDM. Although a subcarrier processing process of the OFDM is introduced in the DFT-s-OFDM, the DFT-s-OFDM is essentially a single-carrier waveform.

It has been determined to use both the OFDM waveform and the DFT-s-OFDM waveform on an uplink of a new-generation wireless communications standard-5G The OFDM waveform can provide a higher system capacity in a high signal-to-noise ratio scenario, and is applicable to users at a cell center. The DFT-s-OFDM waveform has a low-PAPR characteristic, so that a power amplifier can have higher output power, and wider coverage can be provided. Therefore, the DFT-s-OFDM waveform is applicable to users at a cell edge with limited coverage.

To successfully receive data and control information, a demodulation reference signal (DMRS) is necessary. A hybrid-waveform scenario of the OFDM and the DFT-s-OFDM imposes a new requirement and restriction on DMRS transmission and receiving. For example, the DMRS should not affect frequency-domain scheduling flexibility of the OFDM, the DMRS should not destroy the low-PAPR characteristic of the DFT-s-OFDM, and the DMRS should support multi-user multi-input multi-output (MIMO) transmission of any waveform combination.

In an LTE uplink DMRS sending solution, a waveform used on an LTE uplink is the DFT-s-OFDM. To maintain a low-PAPR characteristic as a DFT-s-OFDM data symbol, an LTE uplink DMRS is consecutively mapped to frequency domain subcarriers, and a used sequence has a low-PAPR characteristic after being transformed to time domain. For example, the sequence used by the LTE uplink DMRS includes a ZC (Zadoff-Chu) sequence and a complex Gold sequence (CGS). To support orthogonal mapping of reference signals on different antenna ports, the LTE uplink DMRS uses a frequency-domain code division multiplexing technology.

In an LTE downlink DMRS sending solution, a waveform used on an LTE downlink is the OFDM, and a DMRS is discretely mapped in time domain and frequency domain. To support orthogonal mapping of reference signals on different antenna ports, the LTE downlink DMRS uses frequency division multiplexing and time-domain code division multiplexing technologies.

In conclusion, the LTE uplink DMRS is consecutively mapped in frequency domain. If the OFDM waveform is used, the DMRS and data cannot be multiplexed, lowering spectral efficiency. The LTE uplink DMRS supports parallel transmission of a plurality of antenna ports through code division multiplexing on a same frequency domain resource. However, for code division multiplexing, sequences need to have a same length, to implement orthogonalization. In addition, to ensure the low-PAPR characteristic, the LTE uplink DMRS needs to be consecutive in frequency domain. Therefore, if the LTE uplink DMRS is used on the 5G uplink, resource scheduling flexibility may be lowered, and a cell throughput may be decreased. The LTE downlink DMRS is discretely mapped in time domain and frequency domain, data and the DMRS are multiplexed in a single OFDM symbol. However, a sequence used by the LTE downlink DMRS does not have a low-PAPR characteristic in time domain. Consequently, this sending manner cannot be applied to the DFT-s-OFDM waveform.

SUMMARY

Embodiments of this application provide a method and device for transmitting a reference signal. The method provides a resource mapping pattern of reference signals corresponding to an OFDM waveform and a DFT-s-OFDM waveform, helping to reduce signaling overheads and system complexity in a scenario in which the two waveforms are applied.

According to a first aspect, an embodiment of this application provides a method for transmitting a reference signal, including: sending, by a network device to user equipment UE, information about a waveform scheduled by the network device for the UE, information about an antenna port scheduled by the network device for the UE, and information about a resource block scheduled by the network device for the UE, where the waveform includes an OFDM waveform or a DFT-s-OFDM waveform, the antenna port indicates a resource mapping pattern used by the UE to send or receive a reference signal, and in a symbol of the resource mapping pattern, a reference signal corresponding to the DFT-s-OFDM waveform is mapped in frequency domain in a comb-shaped manner, and a reference signal corresponding to the OFDM waveform is mapped to a frequency domain resource to which the DFT-s-OFDM waveform is not mapped; and sending, by the network device, the reference signal to the UE or receiving the reference signal from the UE on the resource block based on the information about the waveform, the information about the antenna port, and the information about the resource block. According to this method, the same reference signal resource mapping pattern is applied to the OFDM waveform and the DFT-s-OFDM waveform, to reduce system complexity and overheads. In addition, this method meets restrictions and requirements imposed by the OFDM waveform and the DFT-s-OFDM waveform on a DMRS, and can ensure performance of both waveforms.

In a possible design, the reference signal corresponding to the OFDM waveform is mapped in frequency domain in a comb-shaped manner. In this way, the reference signal of the OFDM waveform and the reference signal of the DFT-s-OFDM waveform have similar resource mapping patterns, and the UE can know a resource mapping pattern of paired UE without knowing a waveform type of the paired UE, to perform interference estimation and cancellation.

In a possible design, the manner in which the reference signal corresponding to the OFDM waveform is mapped in frequency domain is the same as the manner in which the reference signal corresponding to the DFT-s-OFDM waveform is mapped in frequency domain. According to this method, it is convenient for a receive end to perform blind detection for a reference signal, to restore the reference signal.

In a possible design, when the OFDM waveform corresponds to a first quantity of antenna ports, reference signals transmitted through the first quantity of antenna ports are orthogonalized in frequency domain by using orthogonal codes, where the first quantity is a positive integer greater than 1. According to this method, a plurality of antenna ports can be distinguished in a single resource block, to reduce a resource scheduling granularity, and improve scheduling flexibility.

In a possible design, when the DFT-s-OFDM waveform corresponds to a second quantity of antenna ports, reference signals transmitted through the second quantity of antenna ports are orthogonalized in frequency domain by using orthogonal codes, where the second quantity is a positive integer greater than 1. According to this method, a plurality of antenna ports can be distinguished in a single resource block, to reduce a resource scheduling granularity, and improve scheduling flexibility.

In a possible design, the method further includes: sending, by the network device, information about a waveform and information about an antenna port of paired UE of the UE to the UE. Therefore, the UE can perform interference cancellation more effectively.

According to a second aspect, an embodiment of this application provides a method for sending and receiving a reference signal, including: receiving, from a network device, information about a waveform scheduled by the network device for user equipment UE, information about an antenna port scheduled by the network device for the UE, and information about a resource block scheduled by the network device for the UE, where the waveform includes an OFDM waveform or a DFT-s-OFDM waveform, the antenna port indicates a resource mapping pattern used by the UE to send or receive a reference signal, and in a symbol of the resource mapping pattern, a reference signal corresponding to the DFT-s-OFDM waveform is mapped in frequency domain in a comb-shaped manner, and a reference signal corresponding to the OFDM waveform is mapped to a frequency domain resource to which the DFT-s-OFDM waveform is not mapped; and sending, by the UE, the reference signal to the network or receiving the reference signal from the network on the resource block based on the information about the waveform, the information about the antenna port, and the information about the resource block. According to this method, the same reference signal resource mapping pattern is applied to the OFDM waveform and the DFT-s-OFDM waveform, to reduce system complexity and overheads. In addition, this method meets restrictions and requirements imposed by the OFDM waveform and the DFT-s-OFDM waveform on a DMRS, and can ensure performance of both waveforms.

In a possible design, the reference signal corresponding to the OFDM waveform is mapped in frequency domain in a comb-shaped manner.

In a possible design, the manner in which the reference signal corresponding to the OFDM waveform is mapped in frequency domain is the same as the manner in which the reference signal corresponding to the DFT-s-OFDM waveform is mapped in frequency domain. According to this method, it is convenient for a receive end to perform blind detection for a reference signal, to restore the reference signal.

In a possible design, when the OFDM waveform corresponds to a first quantity of antenna ports, reference signals transmitted through the first quantity of antenna ports are orthogonalized in frequency domain by using orthogonal codes, where the first quantity is a positive integer greater than 1. According to this method, a plurality of antenna ports can be distinguished in a single resource block, to reduce a resource scheduling granularity, and improve scheduling flexibility.

In a possible design, when the DFT-s-OFDM waveform corresponds to a second quantity of antenna ports, reference signals transmitted through the second quantity of antenna ports are orthogonalized in frequency domain by using orthogonal codes, where the second quantity is a positive integer greater than 1. According to this method, a plurality of antenna ports can be distinguished in a single resource block, to reduce a resource scheduling granularity, and improve scheduling flexibility.

In a possible design, the method further includes: receiving, by the UE from the network device, information about a waveform and information about an antenna port of paired UE of the UE. Therefore, the UE can perform interference cancellation more effectively.

According to a third aspect, an embodiment of this application provides a network device. The network device includes: a transceiver, configured to send, to user equipment UE, information about a waveform scheduled by the network device for the UE, information about an antenna port scheduled by the network device for the UE, and information about a resource block scheduled by the network device for the UE, where the waveform includes an OFDM waveform or a DFT-s-OFDM waveform, the antenna port indicates a resource mapping pattern used by the UE to send or receive a reference signal, and in a symbol of the resource mapping pattern, a reference signal corresponding to the DFT-s-OFDM waveform is mapped in frequency domain in a comb-shaped manner, and a reference signal corresponding to the OFDM waveform is mapped to a frequency domain resource to which the DFT-s-OFDM waveform is not mapped. Further, the transceiver is configured to send the reference signal to the UE or receive the reference signal from the UE on the resource block based on the information about the waveform, the information about the antenna port, and the information about the resource block. According to this method, the same reference signal resource mapping pattern is applied to the OFDM waveform and the DFT-s-OFDM waveform, to reduce system complexity and overheads. In addition, this method meets restrictions and requirements imposed by the OFDM waveform and the DFT-s-OFDM waveform on a DMRS, and can ensure performance of both waveforms.

In a possible design, the reference signal corresponding to the OFDM waveform is mapped in frequency domain in a comb-shaped manner.

In a possible design, the manner in which the reference signal corresponding to the OFDM waveform is mapped in frequency domain is the same as the manner in which the reference signal corresponding to the DFT-s-OFDM waveform is mapped in frequency domain. According to this method, it is convenient for a receive end to perform blind detection for a reference signal, to restore the reference signal.

In a possible design, when the OFDM waveform corresponds to a first quantity of antenna ports, reference signals transmitted through the first quantity of antenna ports are orthogonalized in frequency domain by using orthogonal codes, where the first quantity is a positive integer greater than 1. According to this method, a plurality of antenna ports can be distinguished in a single resource block, to reduce a resource scheduling granularity, and improve scheduling flexibility.

In a possible design, when the DFT-s-OFDM waveform corresponds to a second quantity of antenna ports, reference signals transmitted through the second quantity of antenna ports are orthogonalized in frequency domain by using orthogonal codes, where the second quantity is a positive integer greater than 1. According to this method, a plurality of antenna ports can be distinguished in a single resource block, to reduce a resource scheduling granularity, and improve scheduling flexibility.

In a possible design, the transceiver is further configured to send information about a waveform and information about an antenna port of paired UE of the UE to the UE. Therefore, the UE can perform interference cancellation more effectively.

According to a fourth aspect, an embodiment of this application further provides user equipment. The user equipment includes: a transceiver, configured to receive, from a network device, information about a waveform scheduled by the network device for the user equipment UE, information about an antenna port scheduled by the network device for the UE, and information about a resource block scheduled by the network device for the UE, where the waveform includes an OFDM waveform or a DFT-s-OFDM waveform, the antenna port indicates a resource mapping pattern used by the UE to send or receive a reference signal, and in a symbol of the resource mapping pattern, a reference signal corresponding to the DFT-s-OFDM waveform is mapped in frequency domain in a comb-shaped manner, and a reference signal corresponding to the OFDM waveform is mapped to a frequency domain resource to which the DFT-s-OFDM waveform is not mapped. Further, the transceiver is configured to send the reference signal to the network or receive the reference signal from the network on the resource block based on the information about the waveform, the information about the antenna port, and the information about the resource block. According to this method, the same reference signal resource mapping pattern is applied to the OFDM waveform and the DFT-s-OFDM waveform, to reduce system complexity and overheads. In addition, this method meets restrictions and requirements imposed by the OFDM waveform and the DFT-s-OFDM waveform on a DMRS, and can ensure performance of both waveforms.

In a possible design, the reference signal corresponding to the OFDM waveform is mapped in frequency domain in a comb-shaped manner.

In a possible design, the manner in which the reference signal corresponding to the OFDM waveform is mapped in frequency domain is the same as the manner in which the reference signal corresponding to the DFT-s-OFDM waveform is mapped in frequency domain. According to this method, it is convenient for a receive end to perform blind detection for a reference signal, to restore the reference signal.

In a possible design, when the OFDM waveform corresponds to a first quantity of antenna ports, reference signals transmitted through the first quantity of antenna ports are orthogonalized in frequency domain by using orthogonal codes, where the first quantity is a positive integer greater than 1. According to this method, a plurality of antenna ports can be distinguished in a single resource block, to reduce a resource scheduling granularity, and improve scheduling flexibility.

In a possible design, when the DFT-s-OFDM waveform corresponds to a second quantity of antenna ports, reference signals transmitted through the second quantity of antenna ports are orthogonalized in frequency domain by using orthogonal codes, where the second quantity is a positive integer greater than 1. According to this method, a plurality of antenna ports can be distinguished in a single resource block, to reduce a resource scheduling granularity, and improve scheduling flexibility.

In a possible design, the transceiver is further configured to receive, from the network device, information about a waveform and information about an antenna port of paired UE of the UE. Therefore, the UE can perform interference cancellation more effectively.

Further, in the foregoing four aspects, a sequence of the reference signal corresponding to the DFT-s-OFDM waveform is a Zadoff-Chu sequence or a complex Gold sequence CGS. Frequency division multiplexing is performed on the reference signal corresponding to the OFDM waveform and data. The information about the waveform, the information about the antenna port, or the information about the resource block may be carried in downlink control information DCI, RRC signaling, or MAC control signaling. The reference signal is a demodulation reference signal DMRS, a channel state information-reference signal CSI-RS, or a sounding reference signal SRS.

According to another aspect, an embodiment of this application provides a computer storage medium, configured to store a computer software instruction used by the foregoing network device or the foregoing UE. The computer software instruction includes a program designed for performing the foregoing method.

BRIEF DESCRIPTION OF DRAWINGS

The following briefly describes accompanying drawings required for describing embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
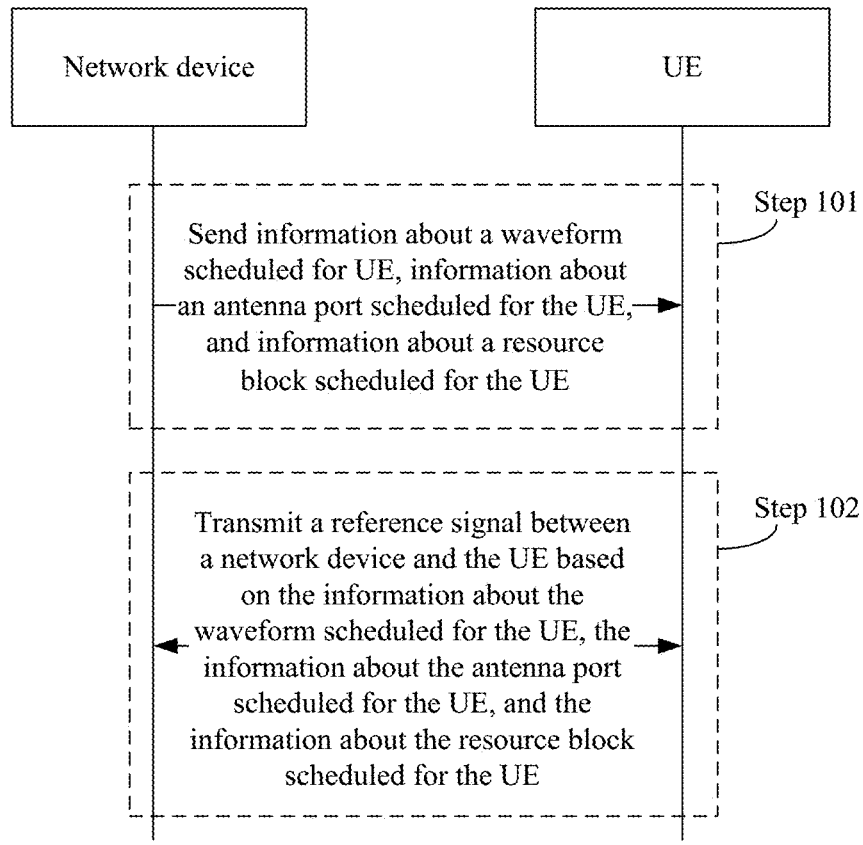
FIG. 1 is a schematic flowchart of a method for transmitting a reference signal according to an embodiment of this application.

The following describes the technical solutions in the embodiments of this application with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

It should be understood that a network device (for example, a base station) in the embodiments of this application is an apparatus that is deployed in a radio access network to provide a wireless communication function for UE. The network device may include a macro base station, a micro base station (also referred to as a small cell), a relay station, an access point, and the like in various forms. In systems that use different radio access technologies, names of a device that has a function of a base station may be different. For example, in an LTE system, the device is referred to as an evolved NodeB (eNB or eNodeB), in a 3rd generation (3G) system, the device is referred to as a NodeB, and in a future new radio (NR) network, the device is referred to as a gNB. For ease of description, in all embodiments of this application, all the apparatuses providing a wireless communication function for UE are referred to as a base station. The UE in the embodiments of this application may be a terminal, and specifically includes but is not limited to a mobile station (MS), a mobile terminal (English: Mobile Terminal), a mobile telephone, a handset, portable equipment, a hand-held device having a wireless communication function, a computing device or another processing device connected to a wireless modem, an in-vehicle device, a wearable device, a terminal device in the future new radio (NR) network, and the like.

In uplink or downlink transmission, the UE may perform transmission by using an OFDM waveform or a DFT-s-OFDM waveform. Waveform scheduling may be triggered by the UE, or may be triggered by the network device, but in both cases, the network device needs to notify the UE of a waveform scheduling result. A waveform is selected mainly depending on whether the UE is within limited coverage. Limited coverage includes but is not limited to the following cases: signal transmission of the UE is severely affected by a propagation loss, and a received signal is relatively weak, and consequently, it is difficult to maintain communication or only low-rate communication can be maintained. In other words, the waveform is selected mainly depending on whether the UE can communicate with the network device well. An implementable method is: The network device monitors channel quality of an uplink transmission channel of the UE. When the channel quality is lower than a threshold, it may be considered that the UE is in a scenario of limited coverage, and the network device may schedule the DFT-s-OFDM waveform for the UE. On the contrary, when the channel quality of the UE is higher than a threshold, it may be considered that the UE is not in a scenario of limited coverage, and the network device may schedule the OFDM waveform for the UE. Certainly, the network device may determine, by using another technical mean, whether the UE is in the scenario of limited coverage, and this is not limited in the embodiments of this application.

Further, the network device further needs to notify the UE of a scheduled antenna port. In this way, the UE may send or receive a reference signal on a corresponding resource element based on a reference signal resource element mapping pattern corresponding to the scheduled antenna port. Specifically, the UE may send or receive the reference signal on the corresponding resource element based on a waveform scheduled by the network device for the UE. The reference signal includes a DMRS, a channel state information-reference signal (CSI-RS), and a sounding reference signal (SRS). Therefore, in the embodiments of this application, the network device needs to notify the UE of the waveform and the antenna port that are scheduled for the UE, so that the UE can send or receive the reference signal based on the scheduled waveform. Based on this, an embodiment of this application provides a method for transmitting a reference signal. FIG. 1 is a schematic flowchart of the method. As shown in FIG. 1, the method includes the following steps.

Step 101: A network device sends, to UE, information about a waveform scheduled by the network device for the UE, information about an antenna port scheduled by the network device for the UE, and information about a resource block scheduled by the network device for the UE.

The waveform includes an OFDM waveform or a DFT-s-OFDM waveform, and the antenna port indicates a resource mapping pattern used by the UE to send or receive a reference signal. Further, the antenna port indicates information such as a reference signal sequence and/or an orthogonal code. The resource mapping pattern refers to a location of the reference signal on a time-frequency resource, the reference signal sequence refers to a sequence used to form the reference signal, and the orthogonal code refers to mutually orthogonal codes that are applied to different antenna ports when code division multiplexing is performed on reference signals of the different antenna ports. In a symbol of the resource mapping pattern, a reference signal corresponding to the DFT-s-OFDM waveform is mapped in frequency domain in a comb-shaped manner, and a reference signal corresponding to the OFDM waveform is mapped to a resource to which the DFT-s-OFDM waveform is not mapped. Comb-shaped mapping in frequency domain means even and discrete mapping in frequency domain or mapping in frequency domain at equal intervals, the reference signal corresponding to the DFT-s-OFDM waveform is a reference signal transmitted by using the DFT-s-OFDM waveform, and the reference signal corresponding to the OFDM waveform is a reference signal transmitted by using the OFDM waveform.

Further, the antenna port may be indicated by using an antenna port number. The antenna port number is a logical concept, and may be defined by using a particular reference signal resource mapping pattern, reference signal sequence, or the like. Generally, it may be considered that data and a reference signal that are transmitted on a same antenna port pass through a same channel in a transmission process. For example, data sent on an antenna port i may be restored based on a channel estimation result obtained by using a reference signal sent on the antenna port i.

It should be noted that the information about the waveform, the information about the antenna port, and the information about the resource block may be separately added to different signaling and sent to the UE, or may be added to a same piece of signaling and sent to the UE, or two pieces of information are added to a same piece of signaling and sent to the UE. This needs to be determined based on scheduling by the network device. For example, a scheduling period of the information about the waveform may be relatively long, and scheduling periods of the information about the antenna port and the information about the resource block may be relatively short. Therefore, the information about the antenna port and the information about the resource block may be sent by using a same piece of signaling, and when the information about the waveform needs to be updated, the information about the waveform is added to the signaling.

Further, this embodiment of this application provides three methods for sending the information about the waveform scheduled by the network device for the UE, the information about the antenna port scheduled by the network device for the UE, and the information about the resource block scheduled by the network device for the UE.

In a first possible design, the network device sends downlink control information (DCI) to the UE. The downlink control information indicates the waveform scheduled for the UE and a number of the antenna port scheduled for the UE. A specific method may be described by using a simple example. For example, DCI in a particular format includes a plurality of fields, and the fields include several bits of 0 or 1. The fields are used to represent particular meanings, for example, resource scheduling and a modulation and coding scheme. In this embodiment of this application, the waveform may be represented by using a particular field. For example, one bit is used to represent the waveform, where a first value (for example, 0) represents the OFDM waveform, and a second value (for example, 1) represents the DFT-s-OFDM waveform. Still further, the antenna port number may be represented by using a similar field. For example, "00" means that only a port 0 is scheduled, "01" means that only a port 1 is scheduled, and "11" means that both a port 0 and a port 1 are scheduled. The UE determines the resource mapping pattern of the reference signal with reference to the field information used to represent the waveform and the field information used to represent the antenna port.

In a second possible design, the waveform scheduled by the network device for the UE and a number of the antenna port scheduled by the network device for the UE may be added to higher layer signaling and sent to the UE. For example, the waveform and the antenna port number are added to signaling such as RRC signaling or MAC signaling. A MAC frame may include a frame header, a control element (CE), and a service data unit (SDU). The CE may be used to carry the information about the waveform and the antenna port number. A specific manner is similar to the manner of using the DCI in the first possible design, and details are not described herein again.

In addition, in the higher layer signaling, the selected waveform may be indicated by using a transmission mode (TM). Table 1 is a table of a correspondence between a transmission mode and a waveform according to an embodiment of this application. As shown in Table 1, a transmission mode is defined, and in this transmission mode, only the OFDM or the DFT-s-OFDM can be used to perform uplink data transmission. When a waveform used by the UE needs to be changed, the network device may instruct, by using higher layer signaling, the UE to use a new waveform. When a waveform used by the UE does not need to be updated by using higher layer signaling, DCI may be used to carry only the number of the antenna port used by the UE.

Table 1: Table of a correspondence between a transmission mode and a waveform according to an embodiment of this application

TABLE 1

| Transmission mode | Waveform |
| --- | --- |
| Transmission mode 1 | DFT-s-OFDM |
| Transmission mode 2 | DFT-s-OFDM |
| Transmission mode 3 | OFDM |
| Transmission mode 4 | OFDM |
| . . . | . . . |

In a third possible design, one transmission mode indicates a plurality of waveforms. Then, after receiving a transmission mode, the UE may determine that a waveform used by the UE is one of a plurality of waveforms corresponding to the transmission mode, but the UE further needs to determine which specific waveform is used. The network device may implicitly indicate a waveform type by using a format of DCI. For example, assuming that a first DCI format corresponds to the OFDM waveform and a second DCI format corresponds to the DFT-s-OFDM waveform, after receiving the transmission mode, the UE detects the DCI to determine the waveform type. Alternatively, the network device may implicitly indicate a waveform type by using a resource mapping manner of data. For example, the resource mapping manner of the data is consecutive resource block (RB) mapping, and it indicates that the waveform scheduled by the network device for the UE in this case is the DFT-s-OFDM waveform. The resource mapping manner of the data is non-consecutive resource block mapping, and it indicates that the waveform scheduled by the network device for the UE in this case is the OFDM waveform.

Particularly, when this solution is applied to a downlink, in addition to the waveform and the antenna port that are used by the UE, in a MU-MIMO or dynamic time division duplex (TDD) scenario, to improve performance, the UE may need to obtain a waveform and an antenna port number of paired UE. The paired UE is other UE scheduled on a same time-frequency resource location as the UE. For example, it is assumed that four UEs in total are scheduled on a particular resource block, and each UE occupies one antenna port. If UE can obtain a waveform and a number of an antenna port that are used by other UE, it helps the UE to perform interference estimation and cancellation. For example, if UE uses a successive interference cancellation method, the UE needs to obtain a waveform of paired UE before demodulating and decoding a signal of the paired UE, to cancel interference generated by the signal of the paired UE. In another example, a reference signal configuration solution of the OFDM waveform may differ from a reference signal configuration solution of the DFT-s-OFDM waveform. The UE needs to obtain a waveform of paired UE before reconstructing a reference signal of the paired UE and performing channel estimation, to cancel interference from the paired UE. Specifically, there may be the following method: The network device adds the waveform and/or the antenna port number of the paired UE to DCI sent to the UE. Alternatively, a correspondence between a waveform and an antenna port is agreed on by using a protocol (or notified to the UE by using higher layer signaling). The UE may learn, by using the antenna port of the paired UE, the waveform used by the paired UE, reconstruct a reference signal of the paired UE based on the waveform, and then perform channel estimation. In addition, a quantity of antenna ports is limited, and the UE may traverse the antenna ports based on the correspondence, to obtain the antenna port of the paired UE. For example, assuming that there are four antenna ports in total, it may be agreed on, by using a protocol, (or it may be notified by using higher layer signaling) that the first two ports are always used to transmit reference signals of the OFDM waveform, and the latter two ports are always used to transmit reference signals of the DFT-s-OFDM waveform. The UE may perform interference estimation and cancellation based on the correspondence between the waveform and the antenna port.

Step 102: Transmit a reference signal between the network device and the UE based on the information about the waveform scheduled by the network device for the UE, the information about the antenna port scheduled by the network device for the UE, and the information about the resource block scheduled by the network device for the UE.

Reference signal transmission includes uplink transmission and downlink transmission, and the following further describes uplink transmission and downlink transmission.

In downlink transmission, the network device sends the reference signal to the UE. After receiving the reference signal, the UE reconstructs the reference signal based on the information about the waveform scheduled by the network device for the UE, the information about the antenna port scheduled by the network device for the UE, and the information about the resource block scheduled by the network device for the UE.

In uplink transmission, the UE sends the reference signal to the network device. The reference signal is generated by the UE based on the information about the waveform scheduled by the network device for the UE, the information about the antenna port scheduled by the network device for the UE, and the information about the resource block scheduled by the network device for the UE.

Further, regardless of uplink transmission or downlink transmission, the reference signal is carried on a time-frequency resource scheduled by the network device for the UE. In other words, the reference signal needs to be sent or received on a corresponding resource location based on an indication of the resource mapping pattern of the reference signal and the information about the resource block.

The method for transmitting a reference signal provided in this embodiment of this application is based on the frequency domain comb-shaped reference signal resource mapping pattern when applied to both the OFDM waveform and the DFT-s-OFDM waveform. According to this method provided in this embodiment of this application, the same reference signal resource mapping pattern is applied to the OFDM waveform and the DFT-s-OFDM waveform, to reduce system complexity and overheads. In addition, this method meets restrictions and requirements imposed by the OFDM waveform and the DFT-s-OFDM waveform on a DMRS, and can ensure performance of both waveforms. In 5G the OFDM waveform and the DFT-s-OFDM waveform are used on an uplink, and a uniform DMRS is designed for the two waveforms, so that a transmitter or a receiver uses similar processes when processing different waveforms, to increase a quantity of reusable modules, and help to reduce complexity of the transmitter and the receiver. In addition, in this uniform design, a system does not need to redundantly design two signaling sets, and parameter information of the two waveforms can be transmitted by using one piece of signaling, to reduce signaling overheads.

The following further describes, with reference to accompanying drawings, the resource mapping pattern used by UE to send or receive the reference signal.

An existing resource mapping pattern used by UE to send or receive a reference signal is designed for either an OFDM waveform or a DFT-s-OFDM waveform, and is not suitable for a case in which both of the two waveforms are used. Both the OFDM waveform and the DFT-s-OFDM waveform are used on a 5G uplink. Therefore, the resource mapping pattern used by the UE to send or receive the reference signal needs to meet requirements of both the OFDM waveform and the DFT-s-OFDM waveform.

Figure 2:
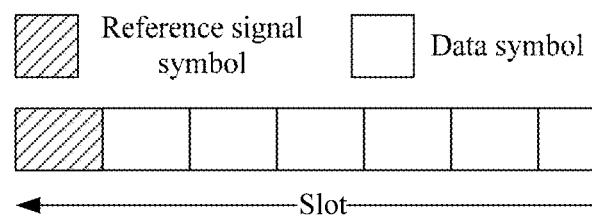
FIG. 2 is a schematic structural diagram of a slot.
Figure 2A:
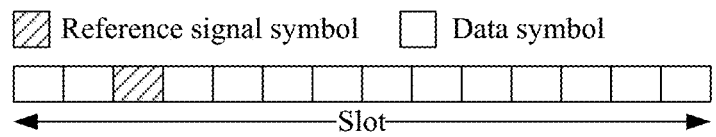
FIG. 2a is a schematic structural diagram of another slot.

FIG. 2 is a schematic structural diagram of a slot, and FIG. 2a is a schematic structural diagram of another slot. As shown in FIG. 2 or FIG. 2a, a slot includes a plurality of symbols of the OFDM waveform or a plurality of symbols of the DFT-s-OFDM waveform. A symbol of the OFDM waveform may be a symbol using the OFDM waveform or an OFDM symbol, and a symbol of the DFT-s-OFDM waveform may be a symbol using the DFT-s-OFDM waveform or a DFT-s-OFDM symbol. In FIG. 2, a slot includes seven symbols, and in FIG. 2a, a slot includes 14 symbols. Some symbols are set to data symbols and are used to transmit only data, the other symbols are set to reference signal symbols and are mainly used to transmit a DMRS, a CSI-RS, or an SRS, and data may further be multiplexed on the symbols. In the slot structures in FIG. 2 and FIG. 2a, there is one reference signal symbol, but a slot may include more reference signal symbols.

Figure 3:
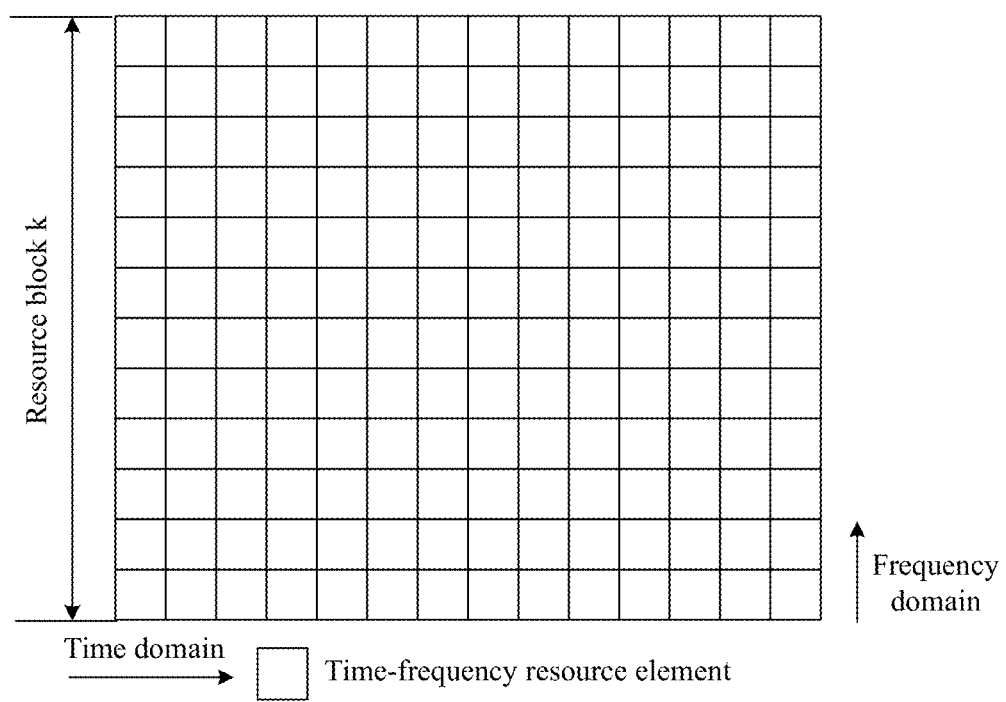
FIG. 3 is a schematic diagram of a grid structure of a time-frequency resource.

Based on the foregoing slot structures, a grid structure of a time-frequency resource may be further obtained. For example, for the OFDM waveform and the DFT-s-OFDM waveform, a continuous time domain signal may be divided into several time-frequency resource grids. In a time-frequency resource grid, a smallest unit of a time domain resource is a symbol, and a smallest unit of a frequency domain resource is a subcarrier. In a scheduling process, a smallest scheduling granularity is a resource block including L symbols and K subcarriers. L and K are positive integers greater than 1. FIG. 3 is a schematic diagram of a grid structure of a time-frequency resource. As shown in FIG. 3, a resource block k includes 14 symbols and 12 subcarriers.

The method for sending and receiving the DMRS applicable to both the OFDM and the DFT-s-OFDM provided in this embodiment of this application may be applied to the foregoing slot structure and time-frequency resource grid structure, and meet different requirements of the OFDM waveform and the DFT-s-OFDM waveform on a reference signal. The following further describes this embodiment of this application by using one resource block as an example.

Figure 4:
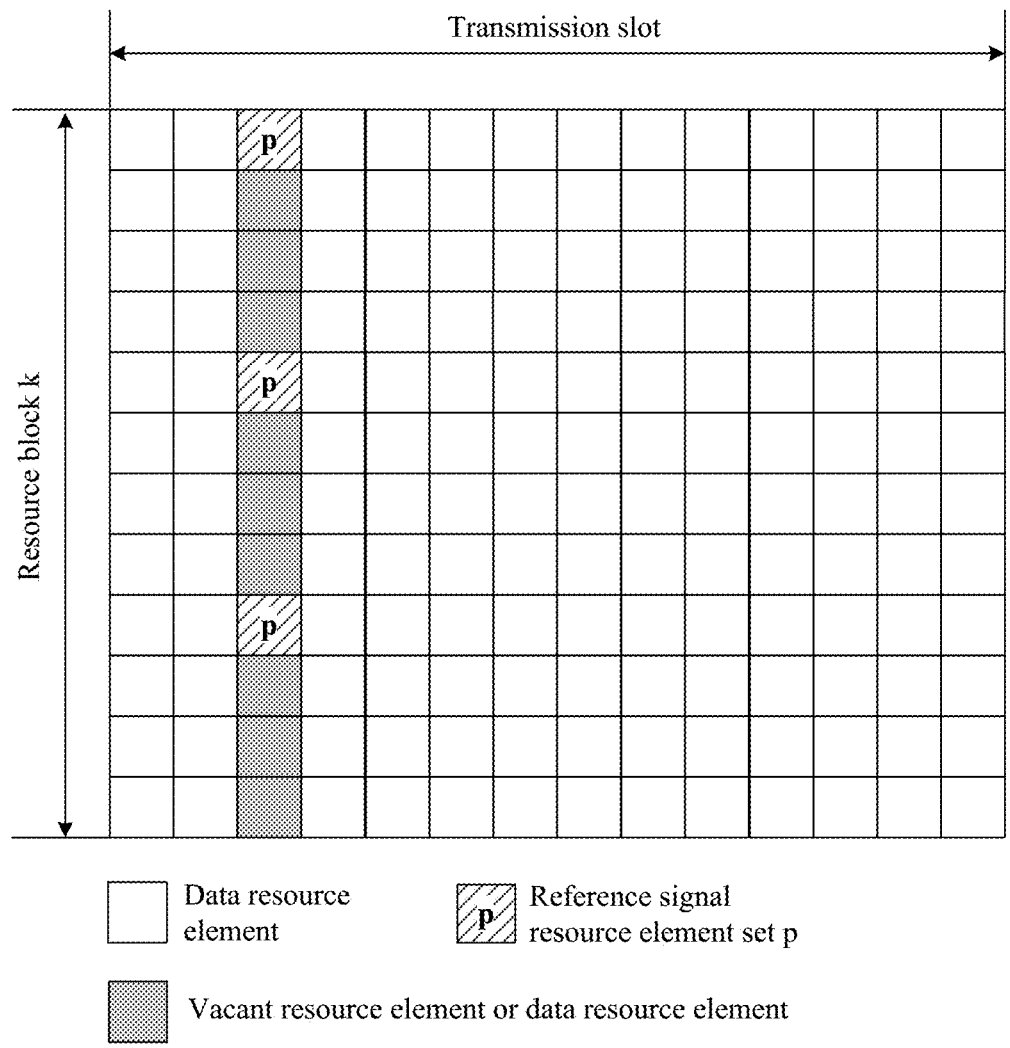
FIG. 4 is a schematic diagram of a resource mapping pattern of a reference signal of a single antenna port.

In one resource block, for an antenna port (marked as an antenna port m), both reference signals corresponding to the OFDM waveform and the DFT-s-OFDM waveform are evenly mapped in frequency domain. FIG. 4 is a schematic diagram of a resource mapping pattern of a reference signal of a single antenna port. As shown in FIG. 4, the reference signal of the antenna port m is mapped to a resource element set p, namely, all resource elements marked as p in FIG. 4. A resource element set p+1 refers to all resource elements marked as p+1 in the resource mapping pattern, and so on, to obtain a resource element set p+2 or more resource element sets.

Figure 5:
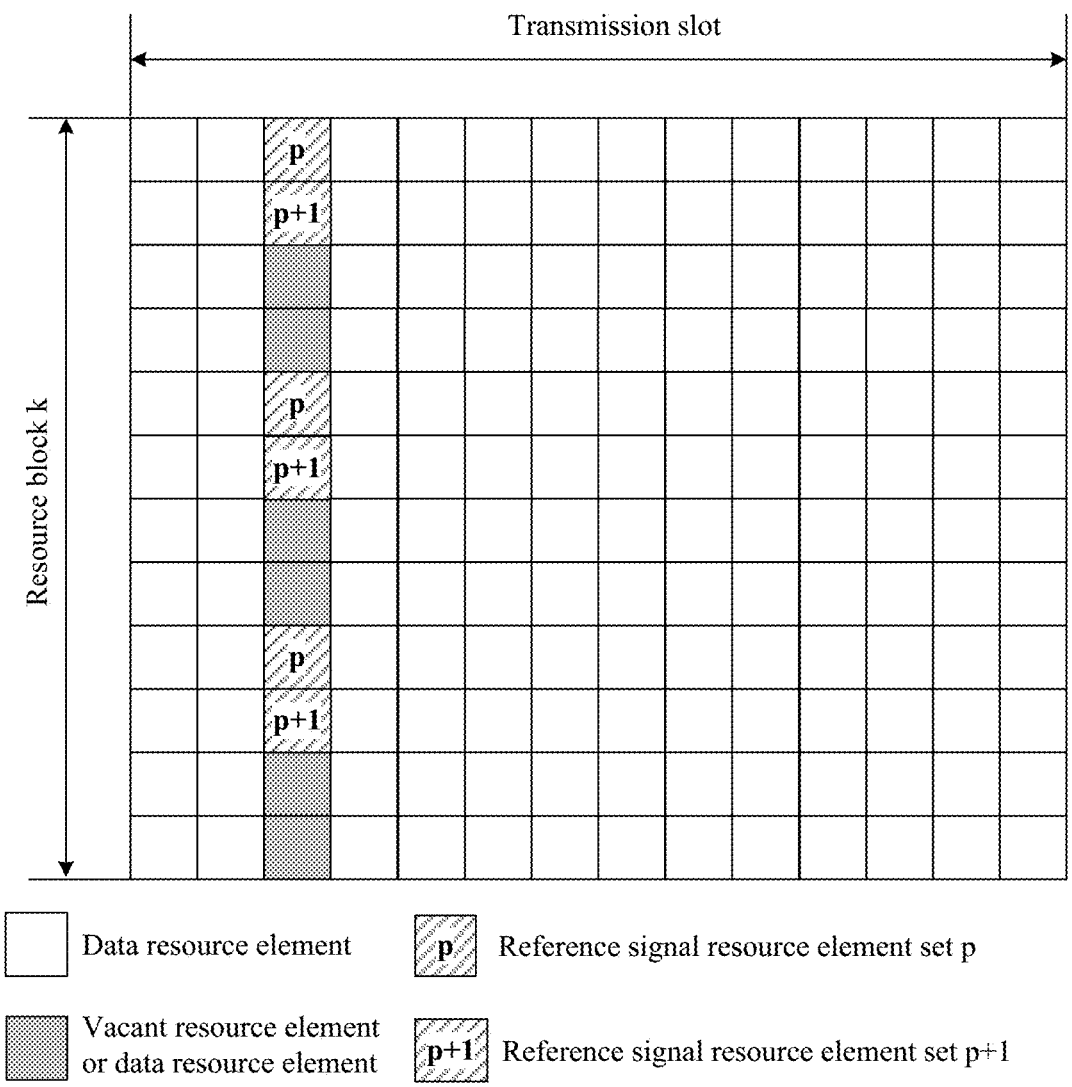
FIG. 5 is a schematic diagram of a resource mapping pattern of reference signals of two antenna ports.

When a plurality of antenna ports are used to transmit reference signals at the same time (for example, the antenna port m and an antenna port m+1 are used to transmit reference signals at the same time), different antenna ports may occupy a same time-frequency resource. For example, in FIG. 4, the antenna port m and the antenna port m+1 may share the resource element set p to transmit the reference signals. Reference signals of different antenna ports occupying a same time-frequency location are orthogonalized through code division multiplexing. Different antenna ports may alternatively occupy different time-frequency resources, but reference signals are evenly mapped in frequency domain. FIG. 5 is a schematic diagram of a resource mapping pattern of reference signals of two antenna ports. As shown in FIG. 5, the reference signal of the antenna port m is mapped to a resource element set p, and the reference signal of the antenna port m+1 is mapped to a resource element set p+1. In this way, the reference signal of the antenna port m and the reference signal of the antenna port m+1 are orthogonalized through frequency division multiplexing.

Figure 6:
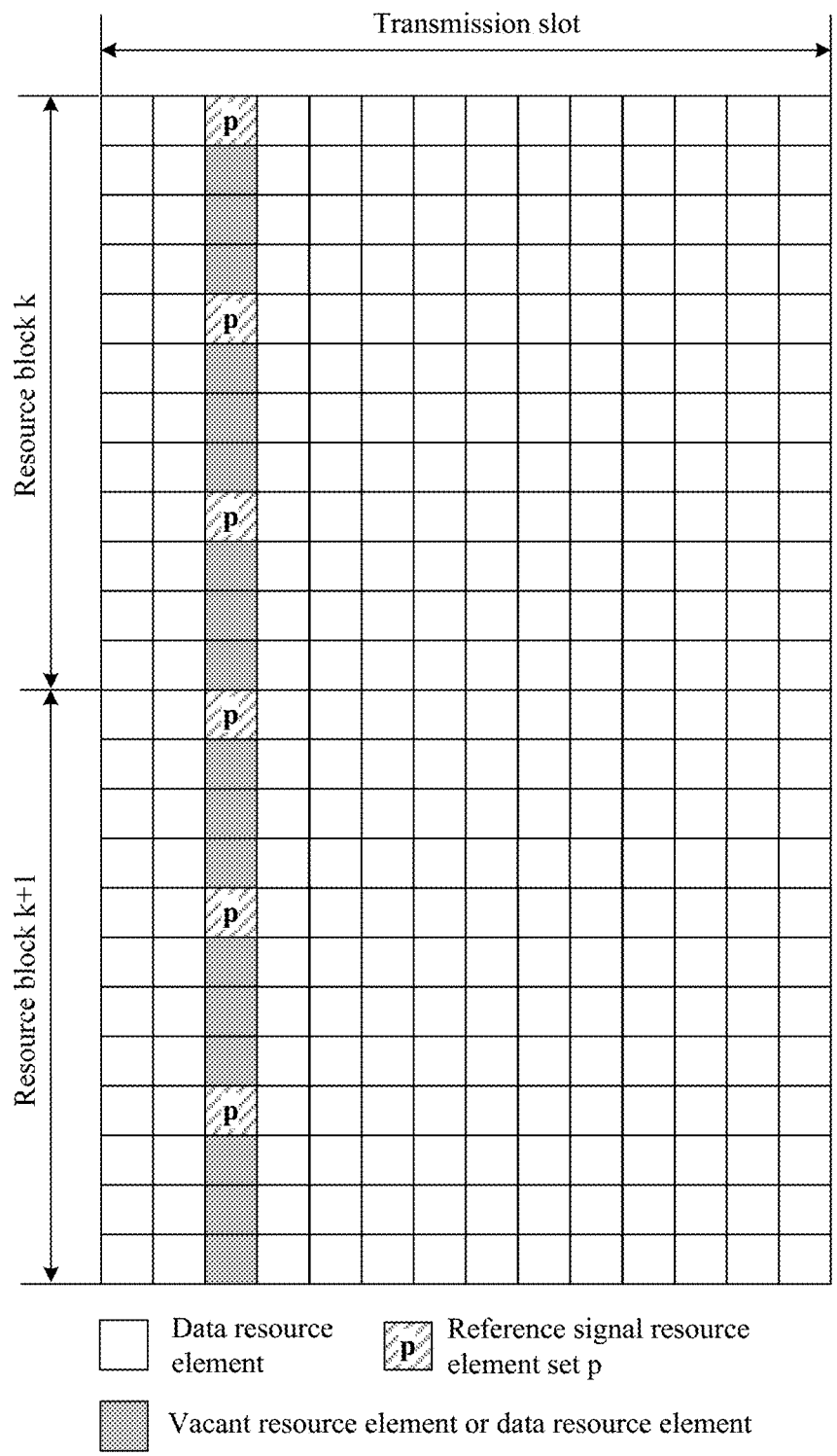
FIG. 6 is a schematic diagram of a resource mapping pattern of a reference signal of a DFT-s-OFDM waveform.

FIG. 6 is a schematic diagram of a resource mapping pattern of a reference signal of a DFT-s-OFDM waveform. As shown in FIG. 6, when the scheduled waveform is the DFT-s-OFDM waveform, resource blocks allocated to the UE are consecutive in frequency domain. In other words, a reference signal of the DFT-s-OFDM waveform is evenly mapped to one resource block in frequency domain, for example, the reference signal resource element set p in FIG. 4. When the reference signal is mapped to a plurality of resource blocks, the plurality of resource blocks need to be consecutive resource blocks, for example, a resource block k and a resource block k+1 shown in FIG. 6. In this case, a sequence of the reference signal may be a time domain low-PAPR sequence, for example, a ZC sequence or a CGS. It should be noted that the low-PAPR sequence means that a PAPR of the sequence is approximate to a PAPR of a symbol, modulated through quadrature phase shift keying (QPSK), of the DFT-s-OFDM waveform.

Figure 7:
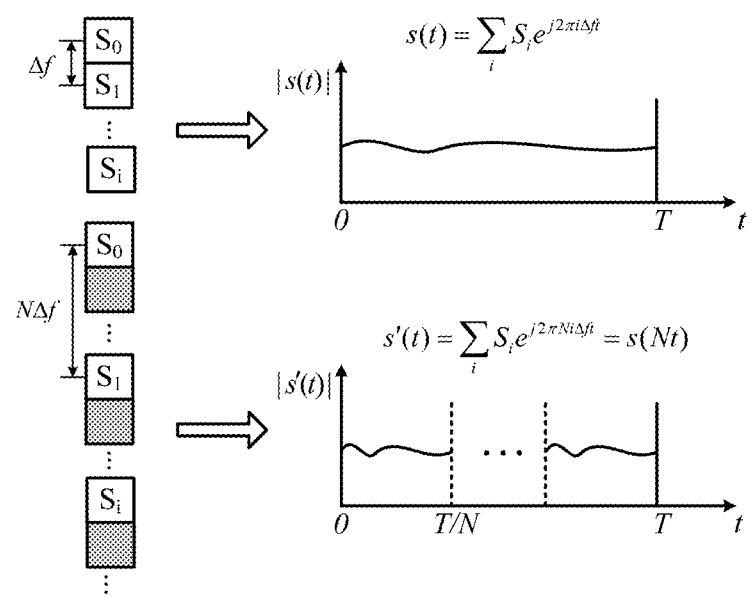
FIG. 7 is schematic diagrams of time domain waveforms during consecutive mapping and discrete mapping of a low-PAPR sequence in frequency domain.

FIG. 7 is schematic diagrams of time domain waveforms during consecutive mapping and discrete mapping of a low-PAPR sequence in frequency domain. As shown in FIG. 7, it is assumed that a sequence of a reference signal is $S_i$, where i is a sequence index. When $S_i$ is consecutively mapped in frequency domain, a time domain waveform corresponding to $S_i$ is s(t). It can be learned from FIG. 7 that s(t) is a low-PAPR waveform. When $S_i$ is evenly and discretely mapped in frequency domain at an interval of N subcarriers, a time domain waveform corresponding to $S_i$ is s(Nt). It can be learned from FIG. 7 that s(Nt) is also a low-PAPR waveform. Therefore, when a reference signal that is of the DFT-s-OFDM waveform and that uses a low-PAPR sequence is evenly and discretely mapped in frequency domain, a low-PAPR characteristic can still be achieved.

Figure 8:
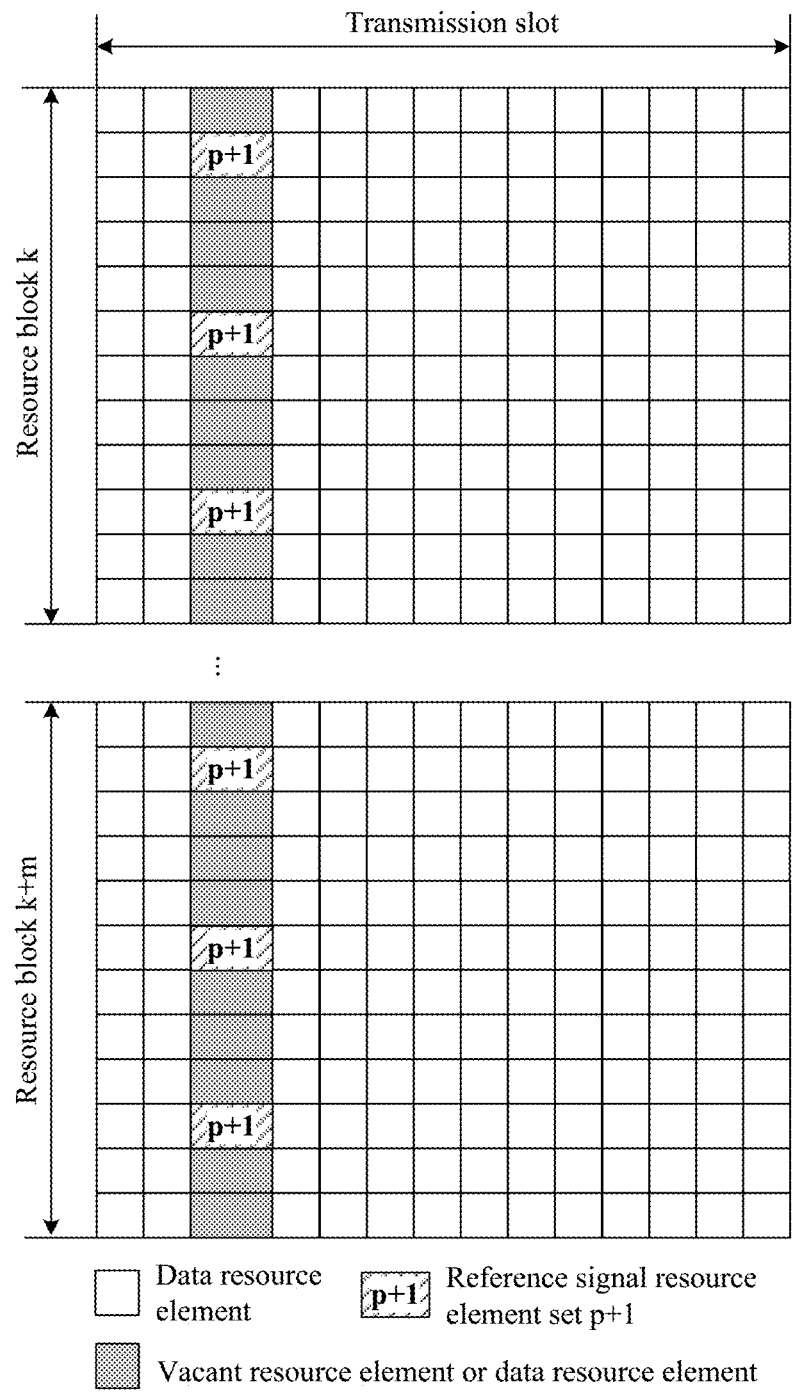
FIG. 8 is a schematic mapping diagram of a reference signal of an OFDM waveform.

FIG. 8 is a schematic mapping diagram of a reference signal of an OFDM waveform. As shown in FIG. 8, when the waveform scheduled for the UE is the OFDM waveform, resource blocks allocated to the UE may be consecutive or discrete in frequency domain. A reference signal sequence may be or may not be a low-PAPR sequence. In addition, when the waveform is the OFDM waveform, frequency division multiplexing may be performed on the reference signal and data. In other words, when the waveform is the OFDM waveform, if gray resource elements in FIG. 8 are not occupied by a reference signal of another antenna port, data may be inserted. However, when the waveform is the DFT-s-OFDM, no data can be inserted at any moment into gray resource elements in FIG. 8, and if data is inserted, a low-PAPR characteristic of the DFT-s-OFDM is destroyed, and consequently, single-carrier performance of the DFT-s-OFDM waveform significantly deteriorates.

As described above, a reference signal corresponding to the OFDM waveform and a reference signal corresponding to the DFT-s-OFDM waveform may use a same low-PAPR sequence (for example, a ZC sequence or a CGS), or may use different sequences (the DFT-s-OFDM still uses a time domain low-PAPR sequence). Because a channel estimation method in a single resource block is unrelated to a type of a waveform, if the two waveforms use a same sequence, when a reference signal sequence is known, a receive end can directly estimate a channel of the reference signal sequence without knowing an interfering waveform, to facilitate interference cancellation. If the two waveforms use different reference signal sequences, the receive end may perform blind detection for the reference signal sequences to determine waveforms, to facilitate data demodulation of grant-free access. Therefore, two configurations have their respective application scenarios.

Therefore, when the UE uses the DFT-s-OFDM waveform, according to the method provided in this embodiment of this application, it can be ensured that sending of a reference signal does not destroy the low-PAPR characteristic of the waveform. When the user uses the OFDM waveform, according to this method, multiplexing for a reference signal and data can be ensured.

In addition, according to this method, a plurality of antenna ports may be supported, to distinguish between a plurality of orthogonal antenna ports in one frequency domain resource block, reduce a frequency domain scheduling granularity, and improve flexibility of MIMO pairing. In other words, antenna ports are orthogonalized in one resource block, so that a previous restriction of "consecutive and symmetrical resources" no longer exists, and flexibility is improved.

The following further describes embodiments of this application by using a reference signal resource mapping pattern scheduled by a base station for UE as an example.

Embodiment 1

This embodiment describes in detail a resource mapping pattern of a reference signal in this embodiment of this application by using an example in which a base station schedules both UE 1 and UE 2 to perform uplink transmission on a same time-frequency resource. The UE 1 uses a DFT-s-OFDM waveform, and the UE 2 uses an OFDM waveform. The base station may perform this operation for different objectives. For example:

In an uplink MU-MIMO scenario, the base station schedules the two UEs at the same time, to increase a cell throughput. Generally, channels of the two UEs have a relatively low correlation, and orthogonal precoding may be used during transmission.

In a non-orthogonal multiple access scenario, signals of the two UEs may be sent in an overlapping manner. In this scenario, channels of the two UEs do not need to have a low correlation, and data of the two UEs can be restored by using a non-linear receiver.

In a multi-cell joint or non-joint scheduling scenario, the two UEs are scheduled in neighboring cells on a same time-frequency resource, and the two UEs use different waveforms. To improve performance, usually, a receiver having an interference rejection capability, for example, an interference rejection combining (IRC) receiver or a successive interference cancellation (SIC) receiver, may be used.

Figure 9:
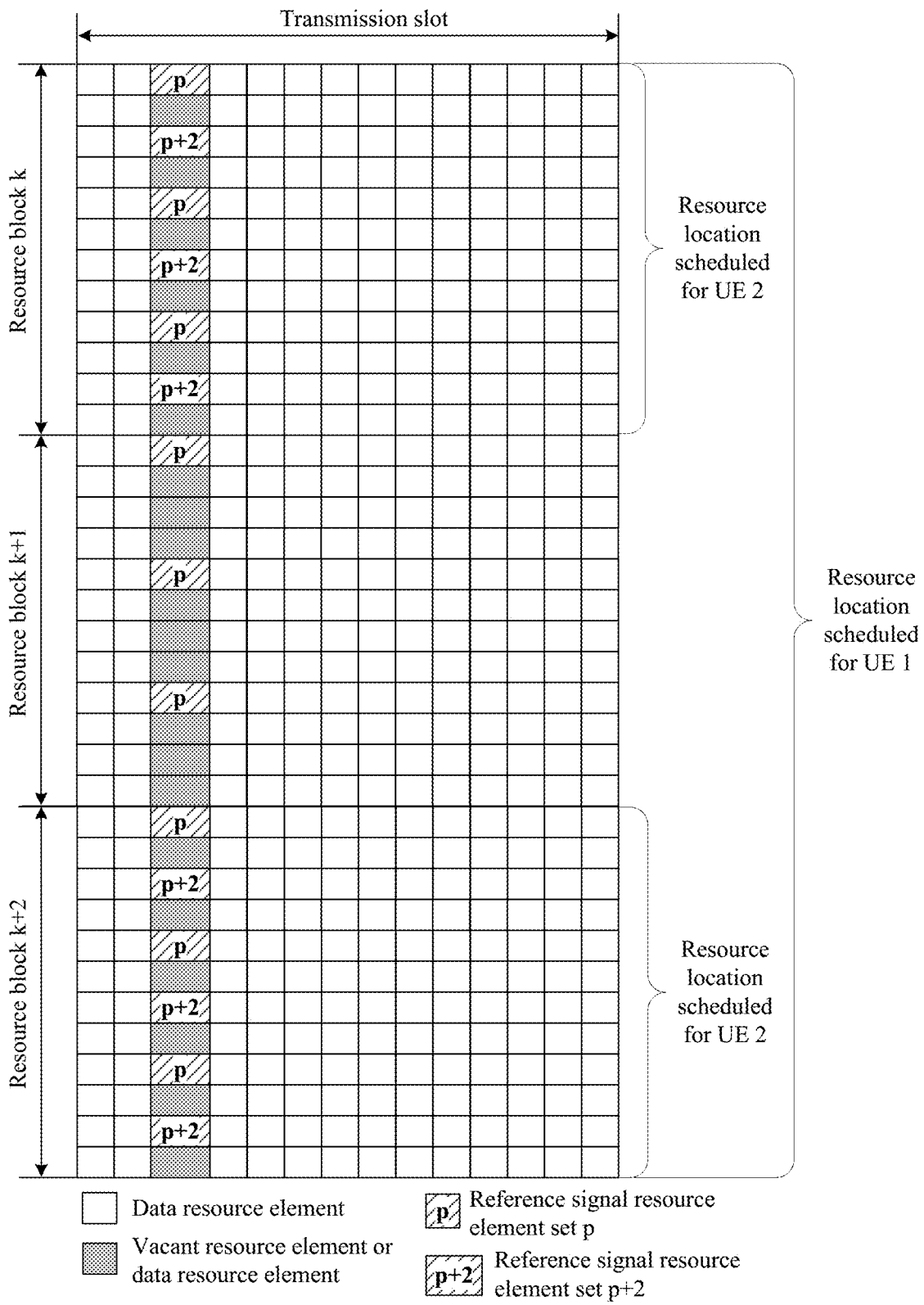
FIG. 9 is a schematic diagram of a resource mapping pattern of reference signals of UE 1 and UE 2 according to an embodiment of this application.

FIG. 9 is a schematic diagram of a resource mapping pattern of reference signals of UE 1 and UE 2 according to an embodiment of this application. As shown in FIG. 9, the UE 1 occupies a reference signal resource element set p, and the UE 2 occupies a reference signal resource element set p+2. It can be learned that the reference signal of the UE 1 is mapped to the resource element set p, and the resource element set p is comb-shaped in frequency domain. In addition, FIG. 9 shows three consecutive resource blocks (RB). The UE 1 is scheduled on the three consecutive RBs, and the reference signal of the UE 1 occupies a frequency domain resource of the three consecutive RBs at even intervals. A sequence of the reference signal of the UE 1 is a time domain low-PAPR sequence, and after the sequence is mapped at even intervals, the sequence still has a low PAPR in time domain. The UE 2 is scheduled on a resource block k and a resource block k+2, the reference signal of the UE 2 occupies the resource element set p+2 on the two resource blocks, and the reference signal of the UE 2 is not sent on a resource block that is not scheduled for the UE 2 (that is, a resource block k+1).

Embodiment 2

In this embodiment, when a plurality of UEs using a DFT-s-OFDM waveform are scheduled, reference signals of the UEs are orthogonalized through code division multiplexing.

Figure 10:
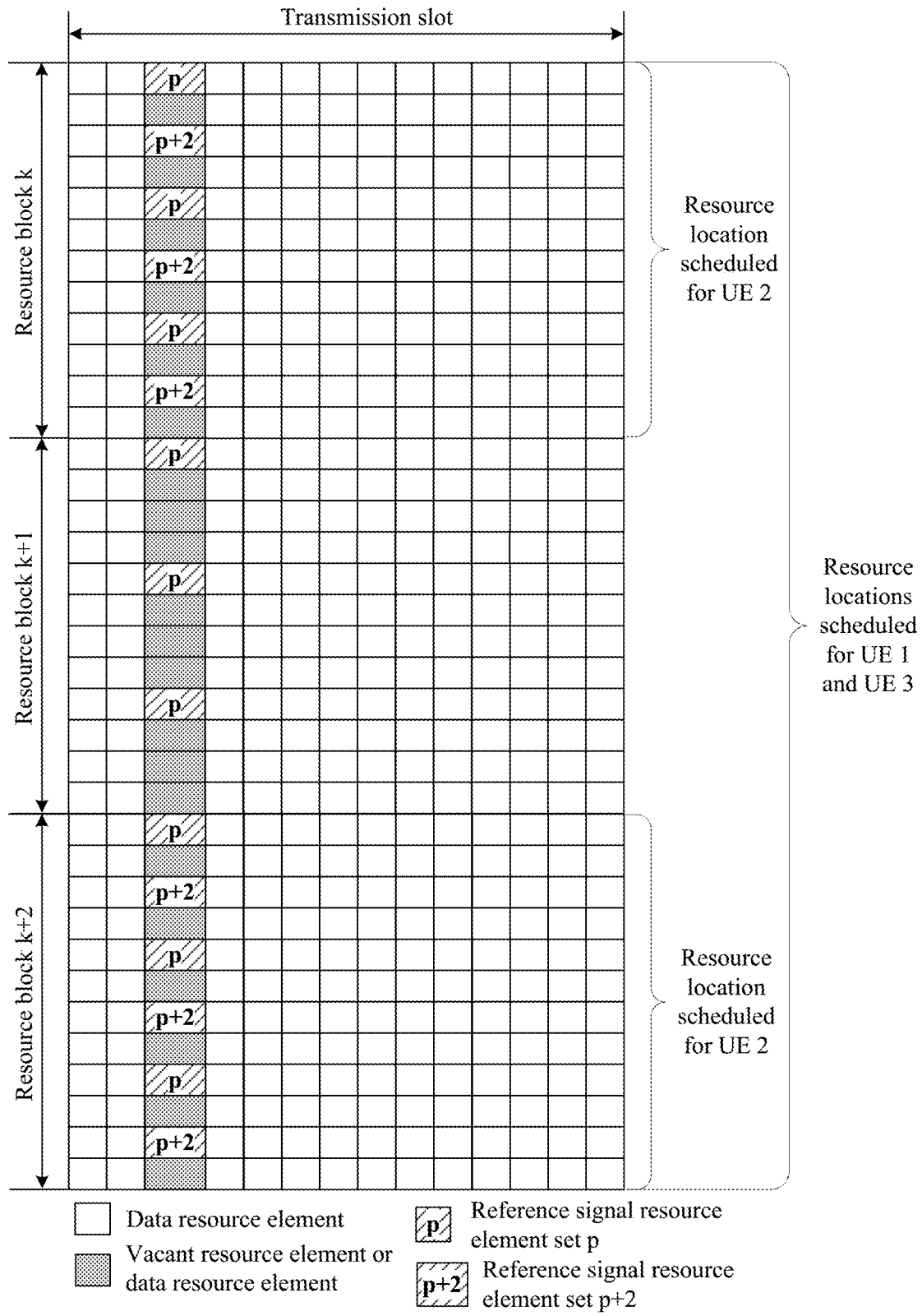
FIG. 10 is a schematic diagram of a resource mapping pattern of reference signals of UE 1, UE 2, and UE 3 according to an embodiment of this application.

FIG. 10 is a schematic diagram of a resource mapping pattern of reference signals of UE 1, UE 2, and UE 3 according to an embodiment of this application. As shown in FIG. 10, a base station schedules the three UEs at the same time. The UE 1 and the UE 3 use the DFT-s-OFDM waveform, and the UE 2 uses an OFDM waveform. Scheduled resources of the UE 1 and the UE 3 completely overlap, and resource elements on which reference signals of the UE 1 and the UE 3 are located may completely overlap, for example, all resource elements marked as p in FIG. 10. It can be learned that the reference signals of the UE 1 and the UE 3 are mapped to a resource element set p, and the resource element set p is comb-shaped in frequency domain. In addition, the UE 1 and the UE 3 use different reference signal sequences to implement code division orthogonalization. For example, the UE 1 and the UE 3 use orthogonal sequences generated through different cyclic shifting of a same ZC sequence, so that a receive end can separately estimate channels of the UE 1 and the UE 3. According to the method provided in this embodiment, UEs using the DFT-s-OFDM waveform can transmit reference signals on a same resource element set, so that a quantity of UEs in multiplexing can be increased.

Embodiment 3

In this embodiment, when a plurality of UEs using a DFT-s-OFDM waveform are scheduled, antenna ports of the UEs are orthogonalized through block-wise code division multiplexing. Specifically, when the DFT-s-OFDM waveform is used, a smallest frequency domain resource granularity of scheduling by a network device is defined as a block. The block may be one resource block, or may be a plurality of resource blocks. A subsequence of a reference signal sequence of UE on each block may be a time domain low-PAPR sequence. When a plurality of UEs using the DFT-s-OFDM waveform need to implement MU-MIMO, frequency domain resources of the UEs do not need to be completely symmetric, but frequency domain resources of different UEs in each block are symmetric. Therefore, subsequences corresponding to the different UEs can be orthogonalized through code division multiplexing.

Figure 11:
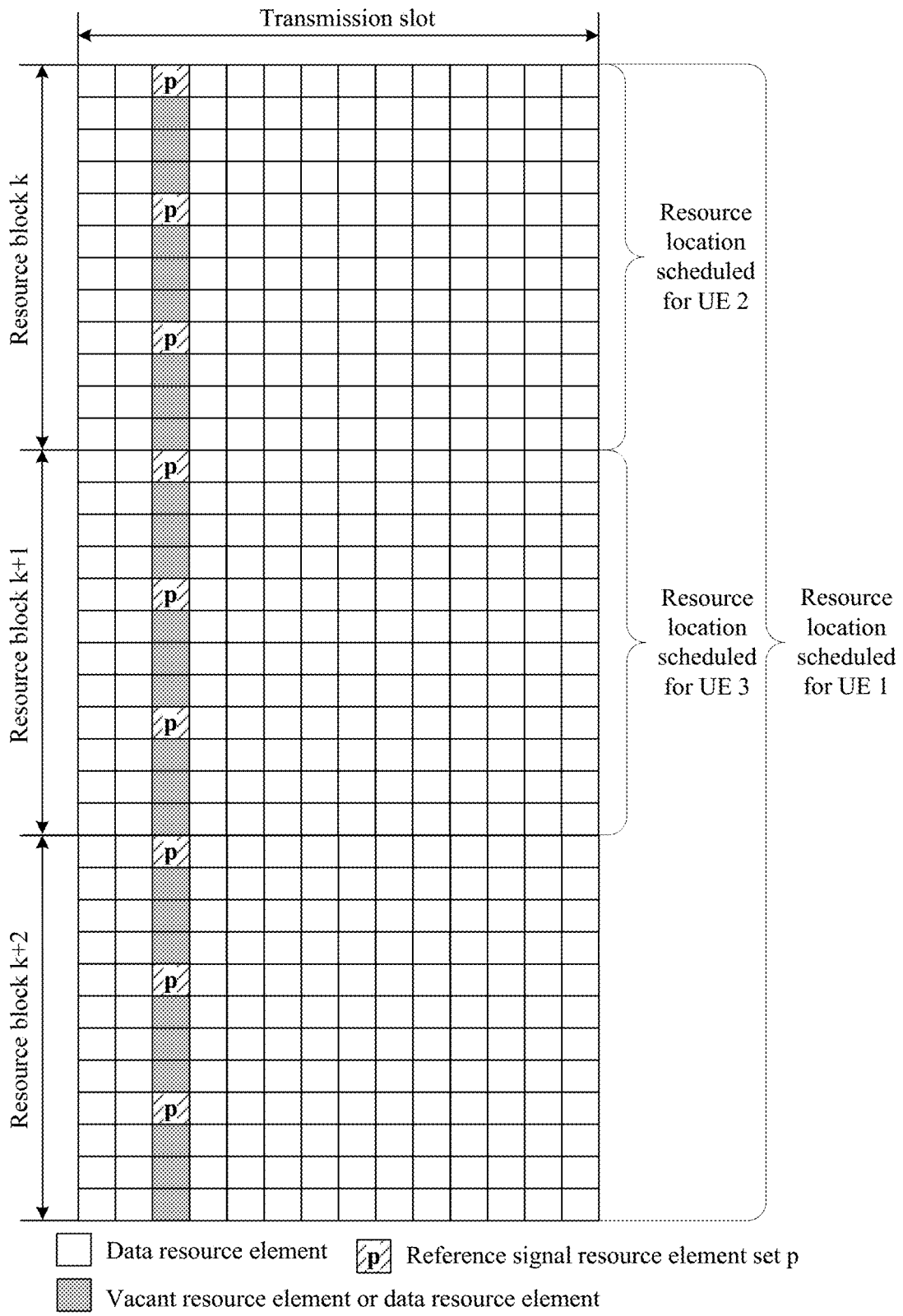
FIG. 11 is a schematic diagram of a resource mapping pattern of reference signals of UE 1, UE 2, and UE 3 according to an embodiment of this application.

FIG. 11 is a schematic diagram of a resource mapping pattern of reference signals of UE 1, UE 2, and UE 3 according to an embodiment of this application. As shown in FIG. 11, a base station schedules the three UEs at the same time. The UE 1, the UE 2, and the UE 3 use the DFT-s-OFDM waveform. It can be learned that the reference signal of the UE 1 is mapped to a resource element set p, and the resource element set p is comb-shaped in frequency domain. The reference signal of the UE 2 is mapped to resource elements marked as p in a resource block k, and the resource elements are also comb-shaped. The UE 3 is similar. Assuming that the block is a resource block. FIG. 11 shows three resource blocks, namely, three blocks. The UE 1 occupies the three blocks, and a sequence of the reference signal of the UE 1 includes three subsequences (for example, a subsequence 1, a subsequence 2, and a subsequence 3). Each of the UE 2 and the UE 3 occupies only one block, and a sequence of a reference signal of each of the UE 2 and the UE 3 includes only one subsequence. In the resource block k, the subsequence 1 of the UE 1 and the sequence of the reference signal of the UE 2 are orthogonalized through code division multiplexing. In the resource block k+1, the subsequence 2 of the UE 1 and the sequence of the reference signal of the UE 3 are orthogonalized through code division multiplexing.

Different from Embodiment 2, in this embodiment, resources occupied by the UE 1 and the UE 2 partially overlap, and resources occupied by the UE 1 and the UE 3 partially overlap. UEs that use the DFT-s-OFDM waveform and whose frequency domain resources are asymmetric can send reference signals by using a same resource element set through block-wise code division multiplexing.

Embodiment 4

This application is further described in this embodiment from the perspective of channel estimation by a receive end.

Figure 12:
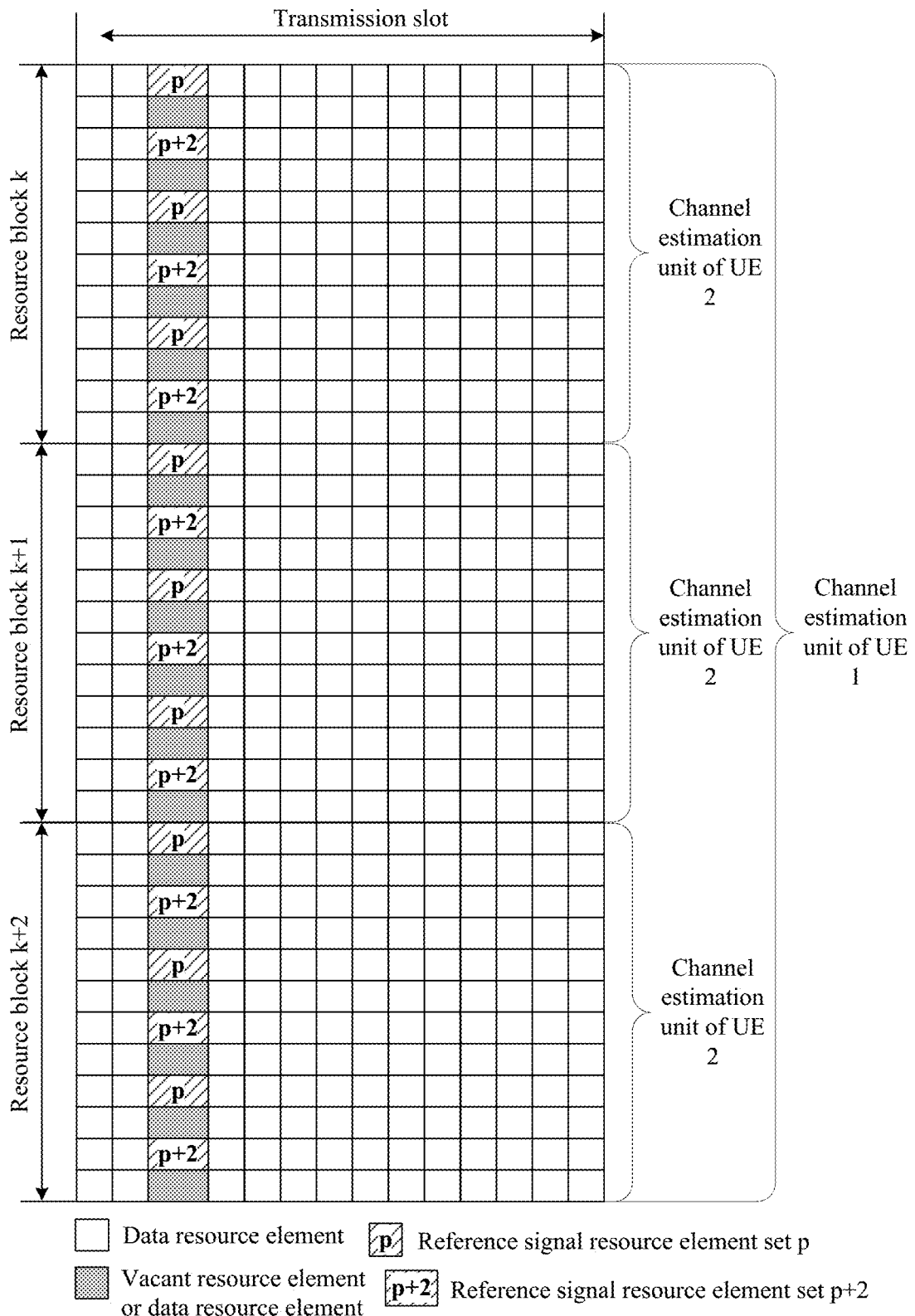
FIG. 12 is a schematic diagram of a resource mapping pattern of reference signals of UE 1 and UE 2 according to an embodiment of this application.

FIG. 12 is a schematic diagram of a resource mapping pattern of reference signals of UE 1 and UE 2 according to an embodiment of this application. As shown in FIG. 12, the UE 1 uses a DFT-s-OFDM waveform, and transmits a reference signal by using a resource element set p, and the UE 2 uses an OFDM waveform, and transmits a reference signal by using a resource element set p+2. It can be learned that the reference signal of the UE 1 is mapped to the resource element set p, and the resource element set p is comb-shaped in frequency domain. The UE 1 and the UE 2 each occupy a plurality of consecutive frequency domain resource blocks. For the UE 1 using the DFT-s-OFDM waveform, a receive end performs joint channel estimation for a plurality of resource blocks. For the UE 2 using the OFDM waveform, unless notified by using signaling, a receive end performs separate channel estimation for the resource blocks one by one.

This embodiment may be applied to the following scenario: The UE using the OFDM waveform may perform precoding by using a resource block as a granularity. This may destroy frequency domain consecutiveness of channels. Consequently, channels of the UE using the OFDM waveform are non-consecutive in many cases. To maintain a low-PAPR characteristic of a waveform, the UE using the DFT-s-OFDM waveform uses a same precoding matrix on an entire frequency band, to maintain frequency domain consecutiveness of channels.

Embodiment 5

This application is further described in this embodiment from the perspective of variable-density reference signal resource mapping.

First, a SIMO scenario, namely, transmission using a single-antenna port (marked as an antenna port m), is considered. The antenna port m is still used to transmit a reference signal on a resource element set p. However, depending on a factor such as a channel condition or transmission load, reference signal resource mapping may have different densities in frequency domain. The density means a ratio of a frequency domain resource occupied by a reference signal to all frequency domain resources.

Figure 13:
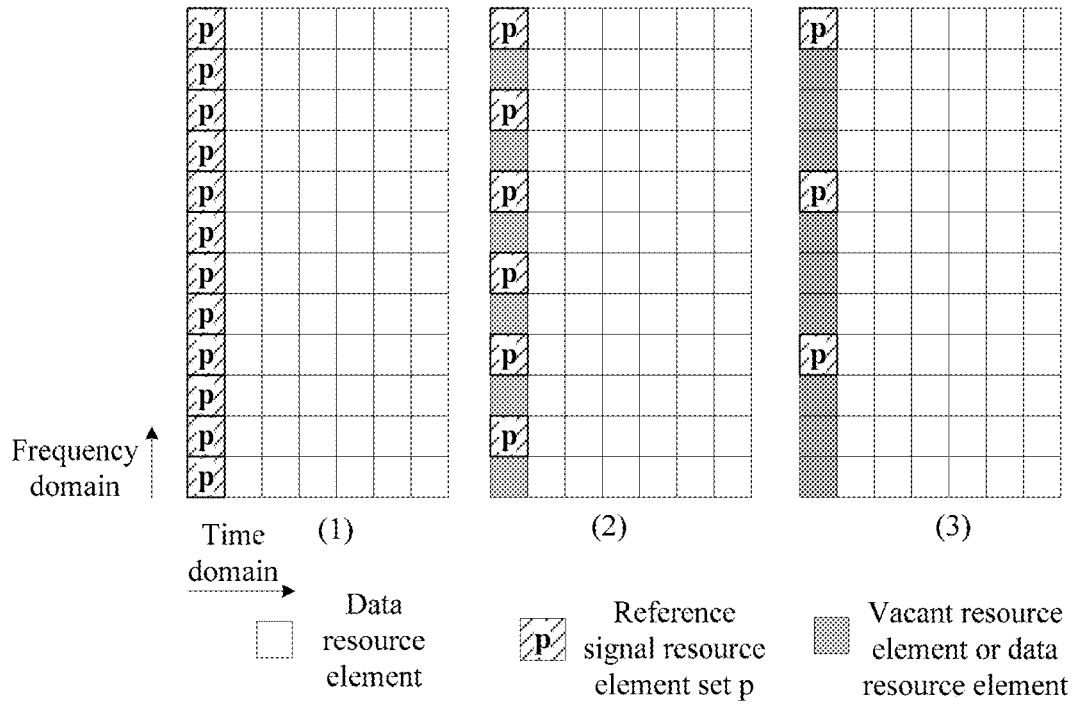
FIG. 13 is schematic diagrams of resource mapping patterns of reference signals having different densities.

FIG. 13 is schematic diagrams of resource mapping patterns of reference signals having different densities. When a UE uses an OFDM waveform, and channel quality is relatively high, a relatively low reference signal density may be used, as shown in (3) in FIG. 13. In this case, a data symbol may be inserted into a resource element between resource elements to which a reference signal is mapped, to reduce overheads of the reference signal. It should be noted that, as shown in (1) in FIG. 13, the resource element set p is distributed evenly rather than discretely, but the resource element set p can still meet requirements of a DFT-s-OFDM waveform and the OFDM waveform.

Figure 14:
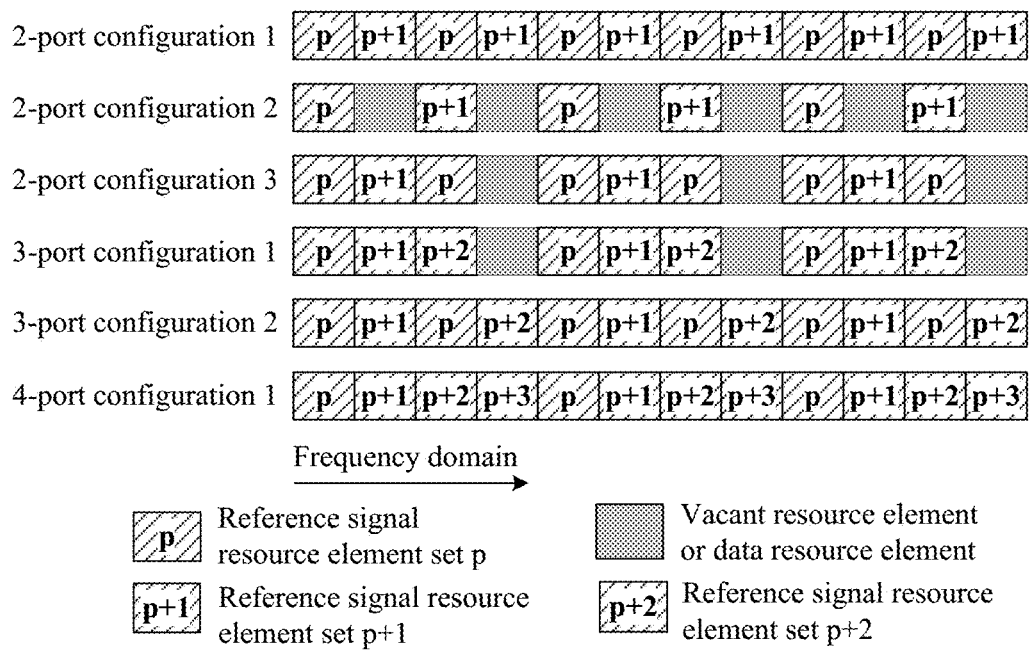
FIG. 14 is a schematic diagram of reference signal resource mapping in a plurality of MIMO scenarios according to an embodiment of this application.

In a MIMO scenario, a plurality of antenna ports are used to transmit reference signals. The plurality of antenna ports may use reference signal resource mapping having different densities, and the reference signals can still be orthogonalized through frequency division. FIG. 14 is a schematic diagram of reference signal resource mapping in a plurality of MIMO scenarios according to an embodiment of this application. Any antenna port may use the OFDM waveform or the DFT-s-OFDM waveform. Reference signals on reference signal resource element sets p and p+1 in FIG. 14 are orthogonal in frequency domain. It can be learned from FIG. 14 that resource element sets p, p+1, p+2, and p+3 are comb-shaped in frequency domain.

Embodiment 6

In this embodiment, an example is given to describe a method for multiplexing reference signals corresponding to a DFT-s-OFDM waveform and an OFDM waveform. When the OFDM waveform corresponds to a first quantity of antenna ports, reference signals transmitted through the first quantity of antenna ports are orthogonalized in frequency domain by using orthogonal codes. The first quantity is a positive integer greater than 1. When the DFT-s-OFDM waveform corresponds to a second quantity of antenna ports, reference signals transmitted through the second quantity of antenna ports are orthogonalized in frequency domain by using orthogonal codes. The second quantity is a positive integer greater than 1. The antenna port corresponding to the OFDM waveform is an antenna port that is used to transmit a reference signal by using the OFDM waveform, and the antenna port corresponding to the DFT-s-OFDM waveform is an antenna port that is used to transmit a reference signal by using the DFT-s-OFDM waveform.

Figure 15:
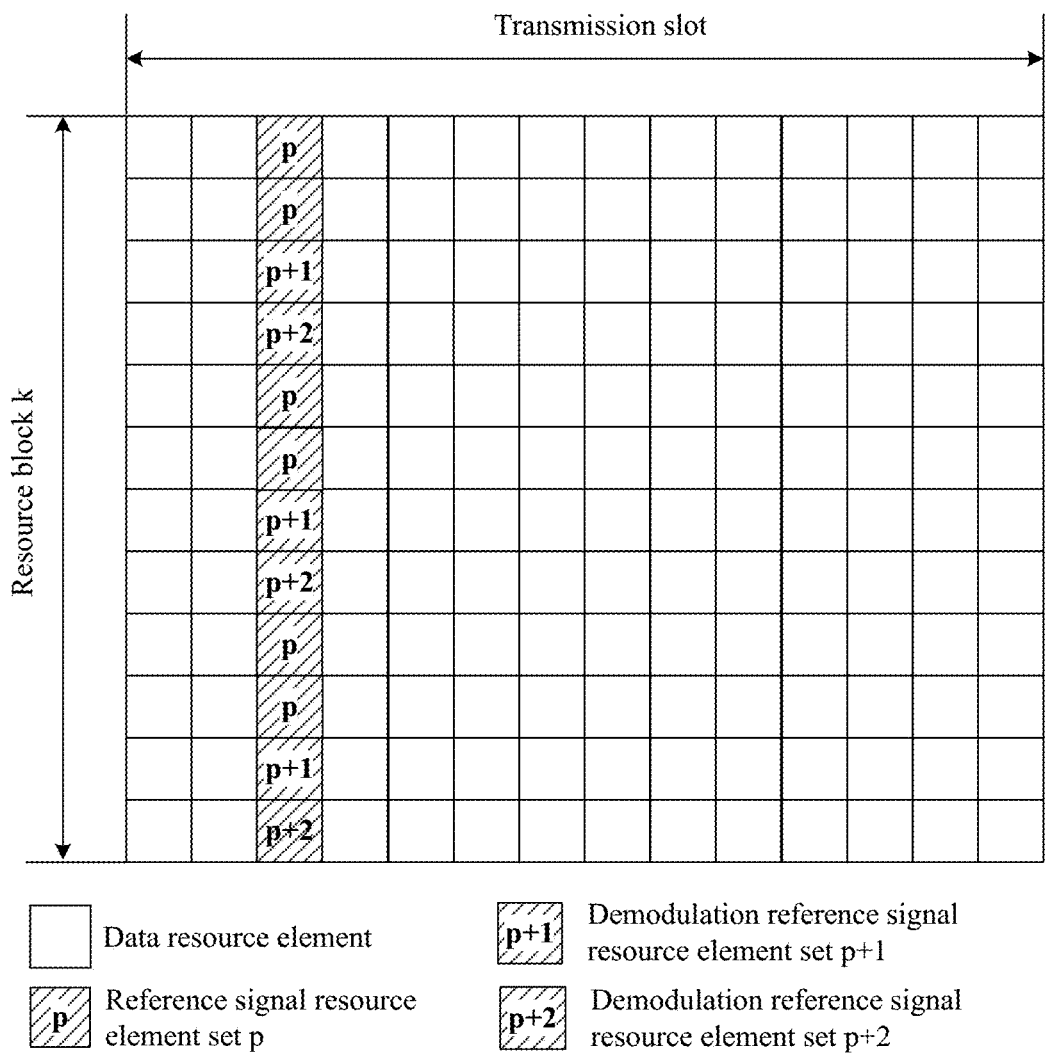
FIG. 15 is a schematic diagram of a resource mapping pattern of reference signals according to an embodiment of this application.

FIG. 15 is a schematic diagram of a resource mapping pattern of reference signals according to an embodiment of this application. Resource element sets p+1 and p+2 are comb-shaped in frequency domain, and each may correspond to one antenna port. The resource element sets p+1 and p+2 are scheduled to UE that sends or receives a reference signal by using the DFT-s-OFDM waveform. The resource element set p is scheduled to UE that sends or receives a reference signal by using the OFDM waveform. The resource element set p includes a plurality of basic units each including two consecutive subcarriers in frequency domain. Particularly, reference signals may be orthogonalized, by using orthogonal codes, on a basic unit including two consecutive subcarriers, so that the reference signals on the basic unit including two consecutive subcarriers do not interfere with each other. Specifically, assuming that s1 and s2 are reference signal symbols on the two consecutive subcarriers, the reference signal symbols may be orthogonalized by using orthogonal codes {[1 1], [1 −1]}. Then, an orthogonal code corresponding to one antenna port is [1 1], and two symbols obtained after the orthogonalization are still s1 and s2; an orthogonal code of another antenna port is [1 −1], and two symbols obtained after the orthogonalization are s1 and −s2. In this way, with reference to the two different orthogonal codes, the resource element set p can be allocated to the two antenna ports for use, reference signals transmitted through the two antenna ports do not interfere with each other. Therefore, the two antenna ports can be scheduled for different UEs for use. For example, a network device sends information about a first antenna port scheduled by the network device for the UE to first UE, sends information about a second antenna port to second UE, sends information about a third antenna port to third UE, and sends information about a fourth antenna port to fourth UE. A resource, used to transmit a reference signal of the first UE, in a resource mapping pattern indicated by the first antenna port is the resource element set p+1 in FIG. 15, a resource, used to transmit a reference signal of the second UE, in a resource mapping pattern indicated by the second antenna port is the resource element set p+2 in FIG. 15, a resource, used to transmit a reference signal of the third UE, in a resource mapping pattern indicated by the third antenna port is the resource element set p in FIG. 15, a resource, used to transmit a reference signal of the fourth UE, in a resource mapping pattern indicated by the fourth antenna port is the resource element set p in FIG. 15, and the third antenna port and the fourth antenna port are orthogonalized by using orthogonal codes.

It should be noted that, in this embodiment, that a reference signal of the DFT-s-OFDM waveform corresponds to two antenna ports, and a reference signal of the OFDM waveform corresponds to an orthogonal code having a length of 2 is used as an example. The reference signal of the DFT-s-OFDM waveform may correspond to more or fewer antenna ports, and the reference signal of the OFDM waveform may correspond to a longer or shorter orthogonal code. Specifically, a method the same as or similar to that in the foregoing description may be used for designing. For example, a resource element set p+2 is of a comb-shaped structure, and may be scheduled for the reference signal corresponding to the DFT-s-OFDM waveform. The resource element sets p and p+1 are used to transmit the reference signal of the OFDM waveform. In this case, on one resource block, the reference signal of the DFT-s-OFDM waveform corresponds to one antenna port, and an orthogonal code corresponding to the reference signal of the OFDM waveform has a length of 3. Further, a resource mapping pattern of a plurality of resource blocks may be designed by using a same or similar design method.

Embodiment 7

In this embodiment, an example is given to describe a method for multiplexing reference signals corresponding to a DFT-s-OFDM waveform and an OFDM waveform. A network device may configure either waveform for any antenna port. The reference signal corresponding to the OFDM waveform is mapped in frequency domain in a comb-shaped manner. Alternatively, a manner in which the reference signal corresponding to the OFDM waveform is mapped in frequency domain is the same as a manner in which the reference signal corresponding to the DFT-s-OFDM waveform is mapped in frequency domain. The "same" herein means that an arrangement manner of resource elements to which the reference signal corresponding to the OFDM waveform is mapped is the same as an arrangement manner of resource elements to which the reference signal corresponding to the DFT-s-OFDM waveform is mapped. However, a parallel displacement may exist in frequency domain between the resource elements specifically occupied by the two reference signals. When the OFDM waveform corresponds to a first quantity of antenna ports, reference signals transmitted through the first quantity of antenna ports are orthogonalized in frequency domain by using orthogonal codes. The first quantity is a positive integer greater than 1. When the DFT-s-OFDM waveform corresponds to a second quantity of antenna ports, reference signals transmitted through the second quantity of antenna ports are orthogonalized in frequency domain by using orthogonal codes. The second quantity is a positive integer greater than 1. The antenna port corresponding to the OFDM waveform is an antenna port that is used to transmit a reference signal by using the OFDM waveform, and the antenna port corresponding to the DFT-s-OFDM waveform is an antenna port that is used to transmit a reference signal by using the DFT-s-OFDM waveform.

Figure 16:
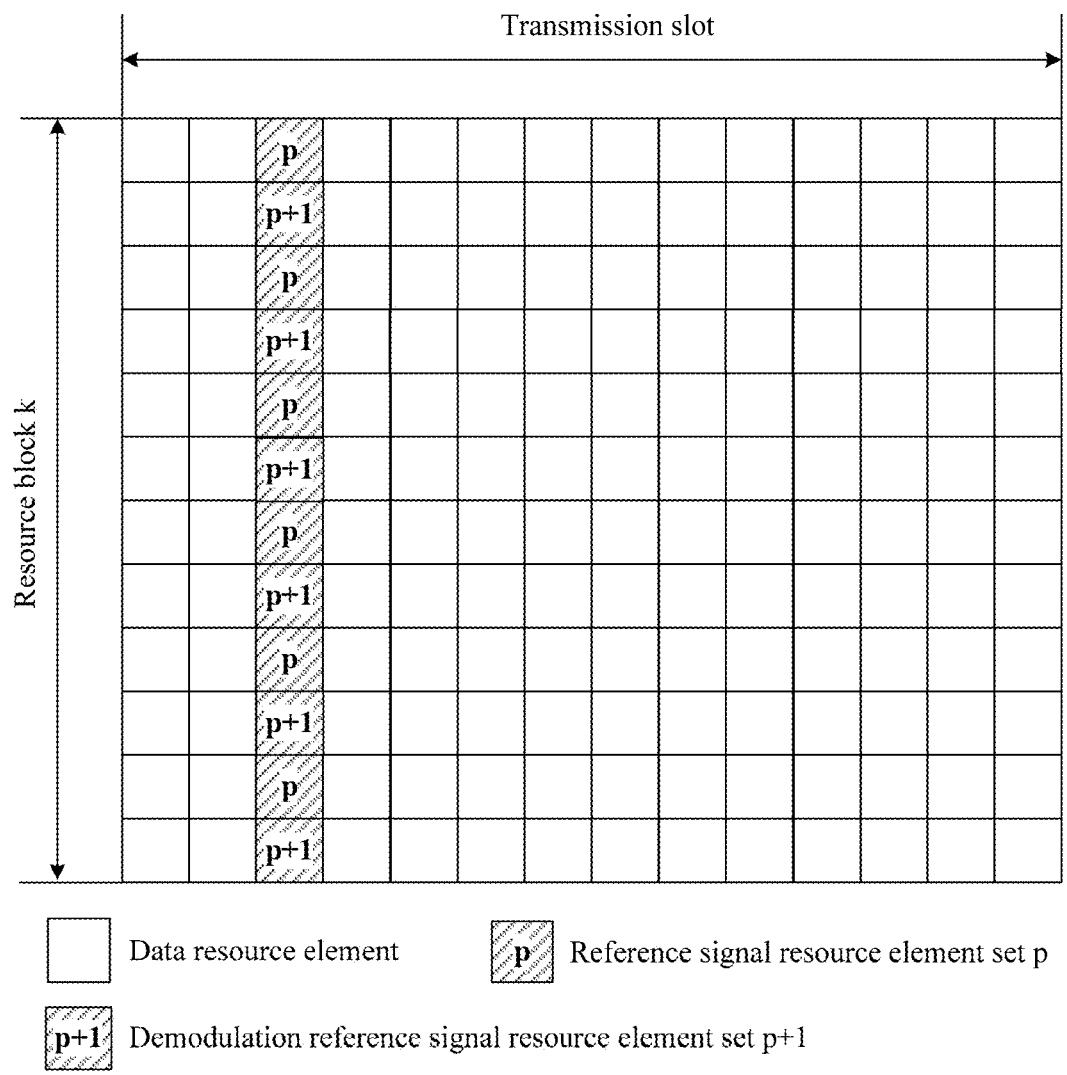
FIG. 16 is a schematic diagram of a resource mapping pattern of reference signals according to an embodiment of this application.

FIG. 16 is a schematic diagram of a resource mapping pattern of reference signals according to an embodiment of this application. As shown in FIG. 16, each of resource element sets p and p+1 is of a comb-shaped structure having a density of ½. Particularly, two reference signals transmitted on the resource element sets p and p+1 are orthogonalized by using orthogonal codes each having a length of 2 (which may be another length, for example, a length of 3). For example, every two resource elements in the resource element set p are orthogonalized as one basic unit, and therefore, the resource element set p may be divided into three basic units. Different from Embodiment 6, in this embodiment, two subcarriers for orthogonalization are non-consecutive in frequency domain. The orthogonal codes and the orthogonalization method are the same as those in Embodiment 6, and details are not described herein again. The resource element sets p and p+1 and two different orthogonal codes may be allocated to four antenna ports for use. For example, the network device sends, to first UE, information about a first antenna port scheduled by the network device for the UE, sends information about a second antenna port to second UE, sends information about a third antenna port to third UE, and sends information about a fourth antenna port to fourth UE. A resource, used to transmit a reference signal of the first UE, in a resource mapping pattern indicated by the first antenna port is the resource element set p in FIG. 16, a resource, used to transmit a reference signal of the second UE, in a resource mapping pattern indicated by the second antenna port is the resource element set p in FIG. 16, a resource, used to transmit a reference signal of the third UE, in a resource mapping pattern indicated by the third antenna port is the resource element set p+1 in FIG. 16, a resource, used to transmit a reference signal of the fourth UE, in a resource mapping pattern indicated by the fourth antenna port is the resource element set p+1 in FIG. 16, the first antenna port and the second antenna port are orthogonalized by using a first orthogonal code, and the third antenna port and the fourth antenna port are orthogonalized by using a second orthogonal code.

Similarly, it should be noted that, in this embodiment, that a resource element set is of a comb-shaped structure having a density of ½ is used as an example, and the method disclosed in this embodiment is also applicable to other densities. When a density of each resource element set is 1/n, resource element sets p, p+1, ..., p+(n−1) can be obtained. Each resource element set includes m resource elements, and orthogonalization having a length of m may be performed on the m resource elements. For example, using a 4-port configuration 1 in FIG. 14 as an example, if orthogonalization having a length of 3 is performed on the resource element set p in this case, the resource element set p may be allocated to three antenna ports for use. In this case, the 4-port configuration may be extended to a 6-port configuration. If orthogonalization having a length of 3 is further performed on the resource element set p+1 in this case, the antenna port configuration in this case may be further extended to an 8-port configuration. Different ports may be scheduled for different UEs for use, to increase a quantity of UEs supported by a reference signal on one resource block.

It should be noted that, in this embodiment of this application, one resource block may include more or fewer symbols and subcarriers. Therefore, according to a design the same as or similar to that in the foregoing description, the method provided in this application may be further applied to a resource block including another quantity of symbols or subcarriers.

It should be noted that the method provided in this embodiment of this application may also be applied to another combination of a multicarrier waveform (for example, a filter bank multicarrier (FBMC) waveform) and a single-carrier waveform (for example, a unique word (UW)-DFT-s-OFDM waveform). For specific details, refer to the foregoing embodiments, and details are not described herein again.

In the foregoing embodiments provided in this application, the method for transmitting a reference signal provided in the embodiments of this application and related signaling are described from the perspective of the network device and the UE. It may be understood that, to implement the foregoing functions, the UE and the network device each include a corresponding hardware structure and/or software module for performing the functions. A person of ordinary skill in the art should easily be aware that with reference to units and algorithms steps in the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 17:
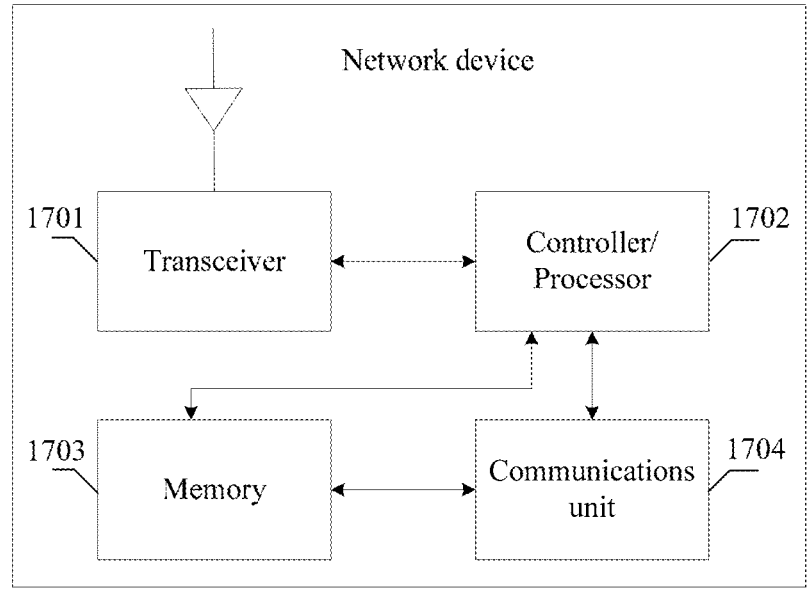
FIG. 17 is a possible schematic structural diagram of a network device according to an embodiment of this application.

FIG. 17 is a possible schematic structural diagram of a network device according to an embodiment of this application. The network device shown in FIG. 17 includes a transceiver 1701 and a controller/processor 1702. The transceiver 1701 may be configured to: support the network device in receiving information from and sending information to the UE in the foregoing embodiment, and support the UE in performing radio communication with other UE. The controller/processor 1702 may be configured to perform various functions for communicating with the UE or another network device. On an uplink, an uplink signal from the UE is received through an antenna, demodulated by the transceiver 1701, and further processed by the controller/processor 1702 to restore service data and signaling message that are sent by the UE. On a downlink, service data and a signaling message are processed by the controller/processor 1702, and modulated by the transceiver 1701 to generate a downlink signal, and the downlink signal is transmitted to the UE through an antenna. Specifically, the transceiver 1701 is configured to send, to the UE, information about a waveform scheduled for the UE, information about an antenna port scheduled for the UE, and information about a resource block scheduled for the UE, and is configured for reference signal transmission with the UE. The controller/processor 1702 may be configured to generate the information about the waveform scheduled for the UE, the information about the antenna port scheduled for the UE, and the information about the resource block scheduled for the UE. The waveform includes an OFDM waveform or a DFT-s-OFDM waveform, and the antenna port indicates a resource mapping pattern used by the UE to send or receive a reference signal. Further, the antenna port indicates information such as a reference signal sequence and/or an orthogonal code. The resource mapping pattern refers to a location of the reference signal on a time-frequency resource, the reference signal sequence refers to a sequence used to form the reference signal, and the orthogonal code refers to mutually orthogonal codes that are applied to different antenna ports when code division multiplexing is performed on reference signals of the different antenna ports. In a symbol of the resource mapping pattern, a reference signal corresponding to the DFT-s-OFDM waveform is mapped in frequency domain in a comb-shaped manner, and a reference signal corresponding to the OFDM waveform is mapped to a resource to which the DFT-s-OFDM waveform is not mapped. Comb-shaped mapping in frequency domain means even and discrete mapping in frequency domain. The resource mapping pattern used by the UE may be any one described above. For related details, refer to the foregoing method embodiment, and details are not described herein again.

It may be understood that FIG. 17 shows only a simplified design of the network device. In actual application, the network device may include any quantities of transmitters, receivers, processors, controllers, memories, communications units, and the like. All network devices capable of implementing this application fall within the protection scope of this application.

Figure 18:
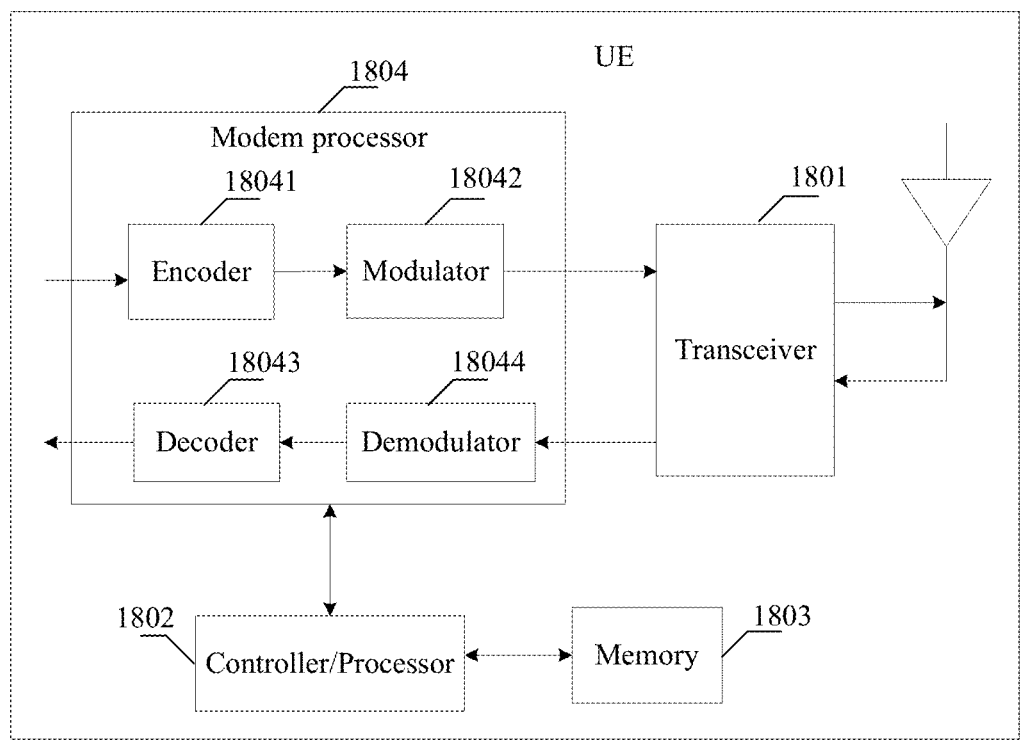
FIG. 18 is a simplified schematic diagram of a possible design structure of UE according to an embodiment of this application.

FIG. 18 is a simplified schematic diagram of a possible design structure of UE according to an embodiment of this application. The UE may be one of the UEs described above. The UE includes a transceiver 1801, and a controller/processor 1802, and may further include a memory 1803 and a modem processor 1804.

The transceiver 1801 adjusts (for example, performs analog conversion, filtering, amplification, and upper-conversion on) an output sample and generates an uplink signal. The uplink signal is transmitted to the base station in the foregoing embodiment through an antenna. On a downlink, an antenna receives a downlink signal transmitted by the base station in the foregoing embodiment. The transceiver 1801 adjusts (for example, performs filtering, amplification, down-conversion, and digitization on) the signal received from the antenna, and provides an input sample. In the modem processor 1804, an encoder 18041 receives service data and a signaling message that are to be sent on the uplink, and processes (for example, formats, encodes, and interleaves) the service data and the signaling message. A modulator 18042 further processes (for example, performs symbol mapping and modulation on) the encoded service data and signaling message and provides an output sample. A demodulator 18044 processes (for example, demodulates) the input sample and provides symbol estimation. A decoder 18043 processes (for example, de-interleaves and decodes) the symbol estimation and provides decoded data and a decoded signaling message that are sent to the UE. The encoder 18041, the modulator 18042, the demodulator 18044, and the decoder 18043 may be implemented by using the integrated modem processor 1804. The units perform processing based on a radio access technology (for example, access technologies of LTE and another evolved system) used by a radio access network.

The controller/processor 1802 controls and manages actions of the UE, and is configured to perform processing performed by the UE in the foregoing embodiment, for example, reference signal reconstruction, and interference estimation and cancellation. For related details, refer to the foregoing method embodiment, and details are not described herein again. The transceiver 1801 is configured to receive information about a waveform, information about an antenna port, and information about a resource block that are sent by a network device, and is configured for reference signal transmission with the network device.

The controller/processor configured to perform functions of the base station or the UE in this application may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

It should be understood that the processor in the embodiments of this application may be implemented by using a processing module, and the transceiver may be implemented by using a transceiver module.

Method or algorithm steps described with reference to the content disclosed in this application may be implemented by hardware, or may be implemented by a processor by executing a software instruction. The software instruction may be formed by a corresponding software module. The software module may be located in a RAM, a flash memory, a ROM, an EPROM, an EEPROM, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiment, and details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for sending and receiving a reference signal, wherein the method comprises:

receiving, by a first user equipment (UE), information about a waveform, an antenna port, and a resource block, wherein the waveform comprises a discrete Fourier transform-spread-orthogonal frequency division multiplexing (DFT-s-OFDM) waveform, the antenna port indicates a resource mapping pattern of the reference signal, a reference signal corresponding to the DFT-s-OFDM waveform, in a symbol of the resource mapping pattern, is mapped in frequency domain in a comb-shaped manner and occupies a first set of reference signal resource elements, and a second set of the reference signal resource elements, in the symbol of the resource mapping pattern, is occupied by a reference signal corresponding to an orthogonal frequency division multiplexing (OFDM) waveform, and wherein the reference signal corresponding to the OFDM waveform is mapped in frequency domain in a comb-shaped manner, or the reference signal corresponding to the OFDM waveform is transmitted on a resource element set comprising two consecutive subcarriers; and sending, or receiving the reference signal on the resource block based on the information about the waveform, the antenna port, and the resource block.

2. The method according to claim 1, wherein the method further comprises:

orthogonalizing, by using an orthogonal code, the reference signal on the resource element set comprising two consecutive subcarriers.

3. A method for sending and receiving a reference signal, wherein the method comprises:

sending, by a network device to a first user equipment device (UE) and a second UE, information about a waveform, an antenna port, and a resource block, wherein a waveform of the second UE is an orthogonal frequency division multiplexing (OFDM) waveform and a waveform of the first UE is a discrete Fourier transform-spread-orthogonal frequency division multiplexing (DFT-s-OFDM) waveform, the antenna port indicates a resource mapping pattern of a reference signal, a reference signal corresponding to the DFT-s-OFDM waveform, in a symbol of the resource mapping pattern, is mapped in frequency domain in a comb-shaped manner and occupies a first set of reference signal resource elements, and wherein a reference signal corresponding to the OFDM waveform, in the symbol of the resource mapping pattern, occupies a second set of the reference signal resource elements and is mapped in frequency domain in a comb-shaped manner, or is transmitted on a resource element set comprising two consecutive subcarriers; and sending, or receiving the reference signal on the resource block based on the information about the waveform, the antenna port, and the resource block.

4. The method according to claim 3, wherein the reference signal on the resource element set comprising two consecutive subcarriers is orthogonalized by using an orthogonal code.

5. A communication device, wherein the communication device comprises:
a transceiver;
at least one processor; and
one or more memories coupled to the at least one processor and storing programming instructions for execution by the at least one processor to cause the communication device to:
receive, by using the transceiver, information about a waveform, an antenna port, and a resource block, wherein the waveform comprises a discrete Fourier transform-spread-orthogonal frequency division multiplexing (DFT-s-OFDM) waveform, the antenna port indicates a resource mapping pattern of a reference signal,
a reference signal corresponding to the DFT-s-OFDM waveform, in a symbol of the resource mapping pattern, is mapped in frequency domain in a comb-shaped manner and occupies a first set of reference signal resource elements, and a second set of the reference signal resource elements, in the symbol of the resource mapping pattern, is occupied by a reference signal corresponding to an orthogonal frequency division multiplexing (OFDM) waveform, and wherein the
reference signal corresponding to the OFDM waveform is mapped in frequency domain in a comb-shaped manner, or the reference signal corresponding to the OFDM waveform is transmitted on a resource element set comprising two consecutive subcarriers, and wherein
send or receive, by using the transceiver, the reference signal on the resource block based on the information about the waveform, the antenna port, and the resource block.

6. The communication device according to claim 5, wherein the programming instructions, when executed by the at least one processor, cause the communication device to:
orthogonalize, by using an orthogonal code, the reference signal on the resource element set comprising two consecutive subcarriers.

7. A network device, wherein the network device comprises:
a transceiver;
at least one processor; and
one or more memories coupled to the at least one processor and storing programming instructions for execution by the at least one processor to cause the network device to:

send, by using the transceiver, to a first user equipment device (UE) and a second UE, information about a waveform, an antenna port, and a resource block, wherein a waveform of the second UE is an orthogonal frequency division multiplexing (OFDM) waveform and a waveform of the first UE is a discrete Fourier transform-spread-orthogonal frequency division multiplexing (DFT-s-OFDM) waveform, the antenna port indicates a resource mapping pattern of a reference signal,
a reference signal corresponding to the DFT-s-OFDM waveform, in a symbol of the resource mapping pattern, is mapped in frequency domain in a comb-shaped manner and occupies a first set of reference signal resource elements, and wherein
a reference signal corresponding to the OFDM waveform, in the symbol of the resource mapping pattern, occupies a second set of the reference signal resource elements and is mapped in frequency domain in a comb-shaped manner, or is transmitted on a resource element set comprising two consecutive subcarriers, and
send or receive, by using the transceiver, the reference signal on the resource block based on the information about the waveform, the antenna port, and the resource block.

8. The network device according to claim 7, wherein the reference signal on the resource element set comprising two consecutive subcarriers is orthogonalized by using an orthogonal code.

9. A non-transitory computer-readable storage medium storing computer instructions, that when executed by one or more hardware processors, cause a communication device to perform operations comprising:
receiving, by a first user equipment (UE), information about a waveform, an antenna port, and a resource block, wherein the waveform comprises a discrete Fourier transform-spread-orthogonal frequency division multiplexing (DFT-s-OFDM) waveform, the antenna port indicates a resource mapping pattern of the reference signal,
a reference signal corresponding to the DFT-s-OFDM waveform, in a symbol of the resource mapping pattern, is mapped in frequency domain in a comb-shaped manner and occupies a first set of reference signal resource elements, and a second set of the reference signal resource elements, in the symbol of the resource mapping pattern, is occupied by a reference signal corresponding to an orthogonal frequency division multiplexing (OFDM) waveform, and wherein the
reference signal corresponding to the OFDM waveform is mapped in frequency domain in a comb-shaped manner, or the reference signal corresponding to the OFDM waveform is transmitted on a resource element set comprising two consecutive subcarriers; and
sending, or receiving the reference signal on the resource block based on the information about the waveform, the antenna port, and the resource block.

* * * * *